(12) United States Patent
Sakezles

(10) Patent No.: US 7,993,140 B2
(45) Date of Patent: *Aug. 9, 2011

(54) MODELS AND METHODS OF USING SAME FOR TESTING MEDICAL DEVICES

(76) Inventor: Christopher Sakezles, Sarasota, FL (US)

( * ) Notice: Subject to any disclaimer, the term of this patent is extended or adjusted under 35 U.S.C. 154(b) by 795 days.

This patent is subject to a terminal disclaimer.

(21) Appl. No.: 11/815,323

(22) PCT Filed: Feb. 1, 2006

(86) PCT No.: PCT/US2006/003549

§ 371 (c)(1),
(2), (4) Date: Aug. 2, 2007

(87) PCT Pub. No.: WO2006/083963

PCT Pub. Date: Aug. 10, 2006

(65) Prior Publication Data

US 2008/0187895 A1    Aug. 7, 2008

Related U.S. Application Data

(60) Provisional application No. 60/749,972, filed on Dec. 13, 2005.

(51) Int. Cl.
G09B 23/28 (2006.01)
(52) U.S. Cl. .................................................. 434/267

(58) Field of Classification Search .............. 434/262, 434/267, 268, 270, 271, 272, 273, 274
See application file for complete search history.

(56) References Cited

U.S. PATENT DOCUMENTS

| | | | | |
|---|---|---|---|---|
| 5,320,537 | A * | 6/1994 | Watson | 434/272 |
| 5,945,056 | A * | 8/1999 | Day et al. | 264/250 |
| 6,062,866 | A | 5/2000 | Prom | |
| 6,205,871 | B1 * | 3/2001 | Saloner et al. | 73/866.4 |
| 6,474,993 | B1 * | 11/2002 | Grund et al. | 434/262 |
| 6,488,507 | B1 | 12/2002 | Stoloff et al. | |
| 6,887,082 | B2 | 5/2005 | Shun | |
| 6,939,138 | B2 | 9/2005 | Chosack et al. | |
| 7,008,232 | B2 | 3/2006 | Brassel | |
| 2004/0234933 | A1 * | 11/2004 | Dawson et al. | 434/262 |
| 2008/0076099 | A1 * | 3/2008 | Sarvazyan et al. | 434/262 |

* cited by examiner

*Primary Examiner* — Kurt Fernstrom
(74) *Attorney, Agent, or Firm* — Timothy H. Van Dyke; Beusse, Wolter, Sanks, Mora & Maire, P.A.

(57) ABSTRACT

Disclosed herein are synthetic anatomical models that are designed to enable simulated use testing by medical device compam'es, medical device designers, individual inventors, or any other entity interested in the performance of medical devices. These models are unique in possessing a level of complexity that allows them to be substituted for either a live animal, an animal cadaver, or a human cadaver in the testing of these devices. These models are further characterized by a similarity of geometry, individual component physical properties, and component-to-component interfacial properties with the appropriate target tissue and anatomy.

6 Claims, 16 Drawing Sheets

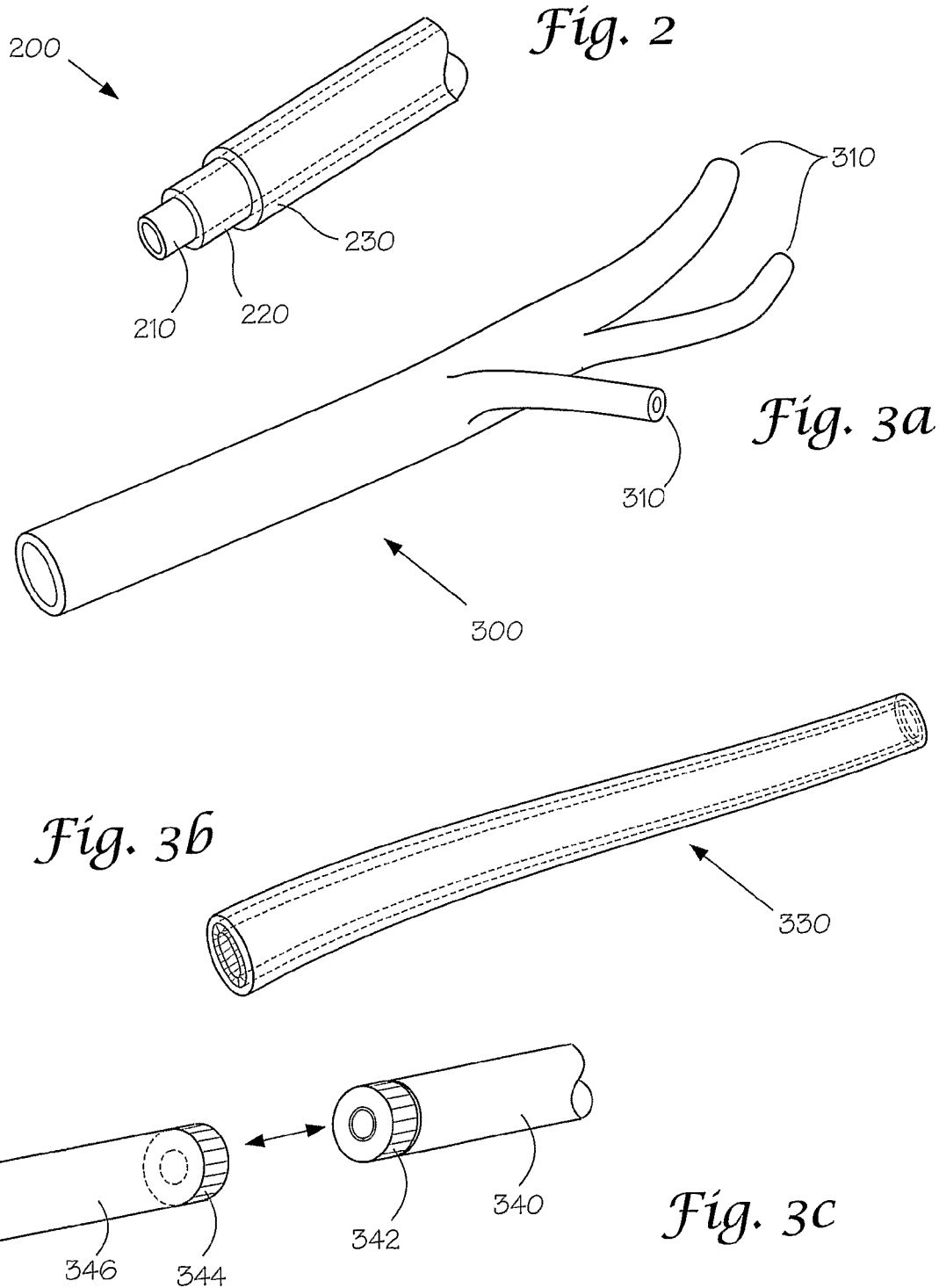

FIG. 7
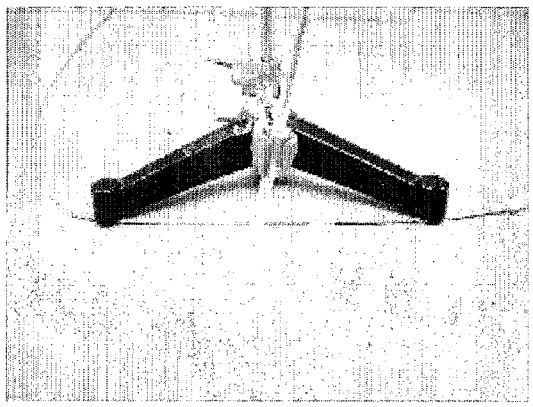 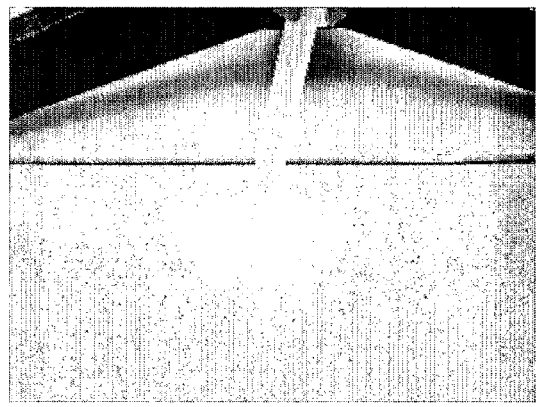
A                                      B

FIG. 9
A
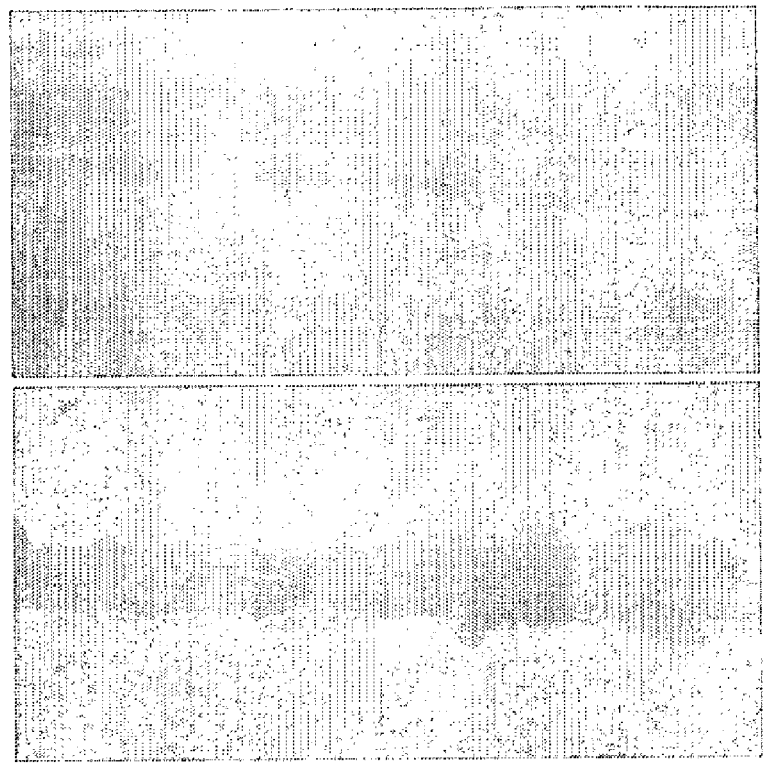
B
C
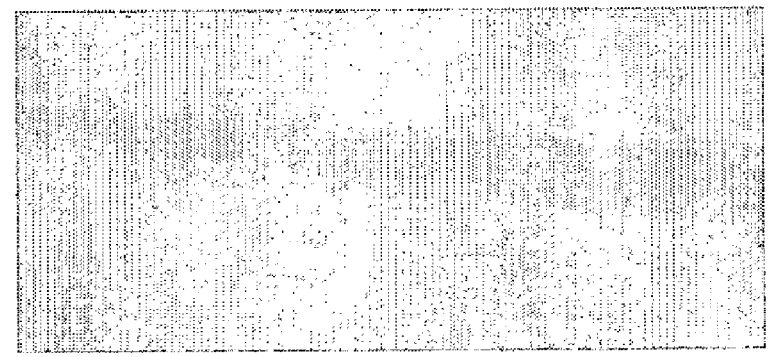

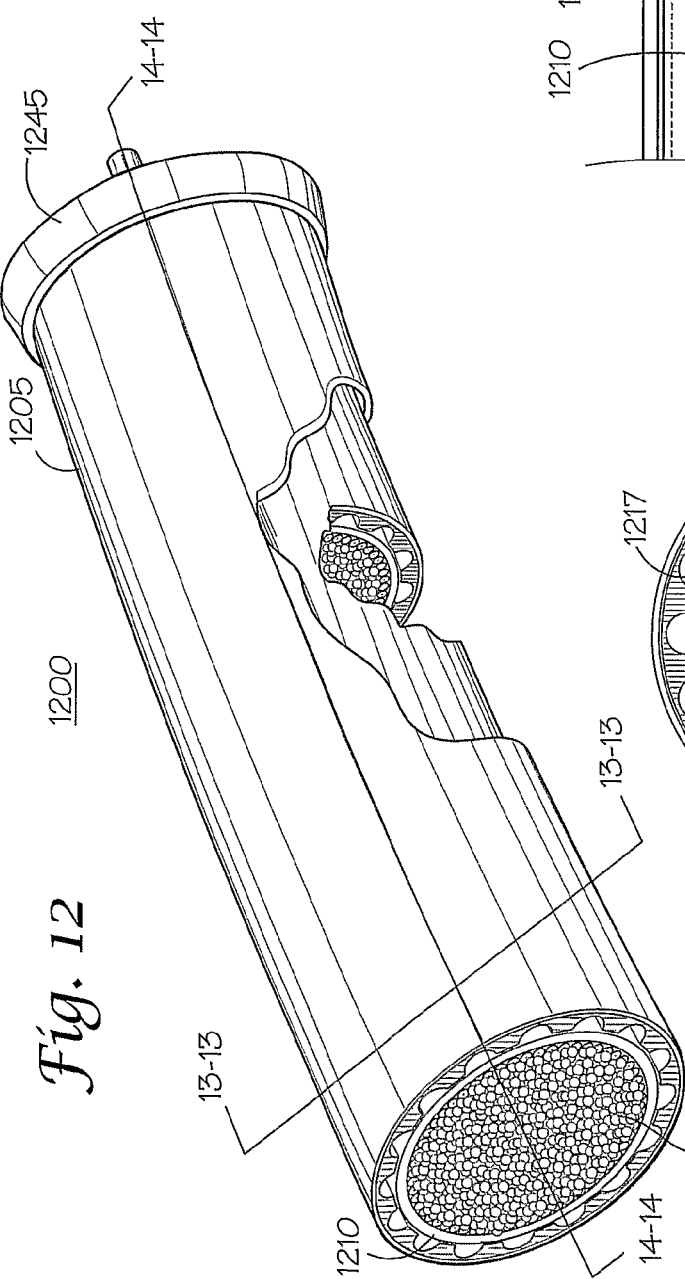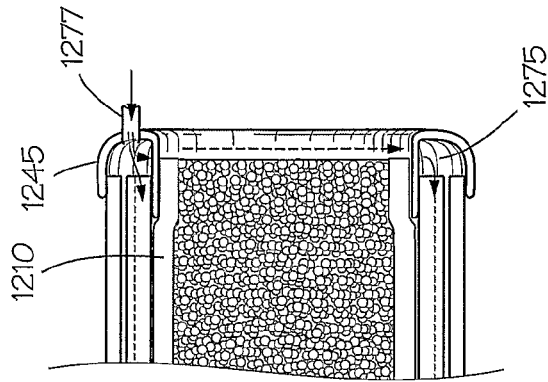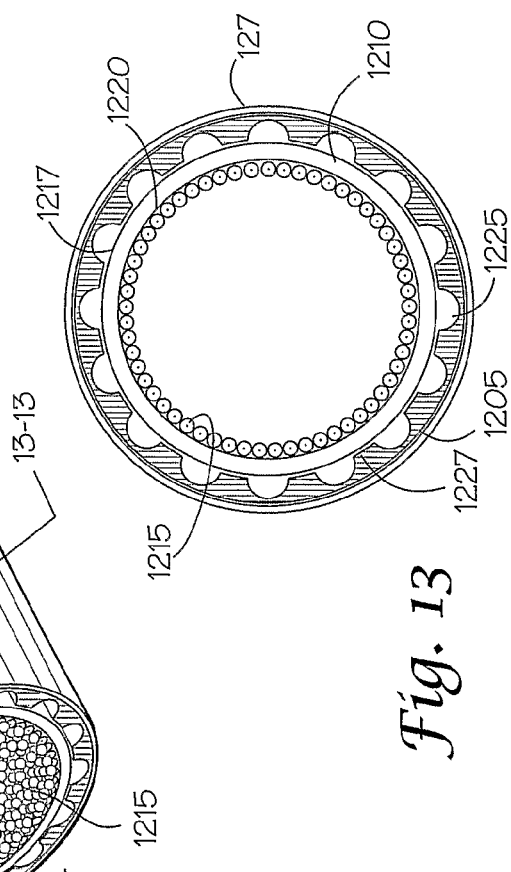

Fig. 16
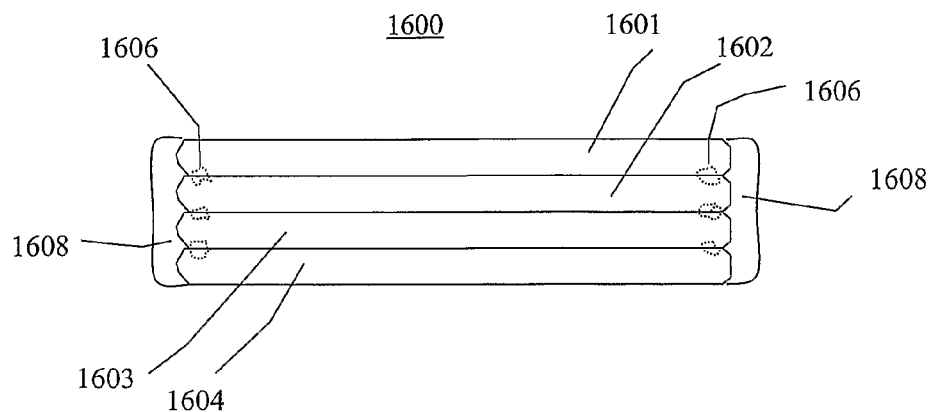
Fig. 17  a.
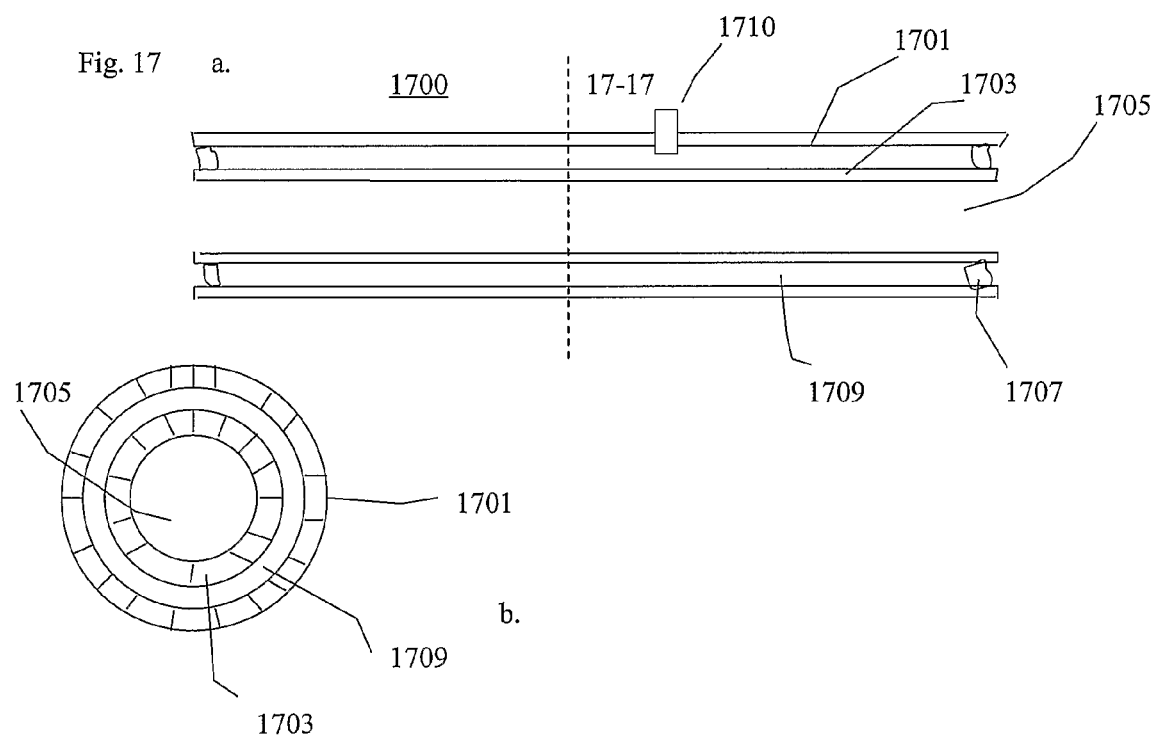
b.

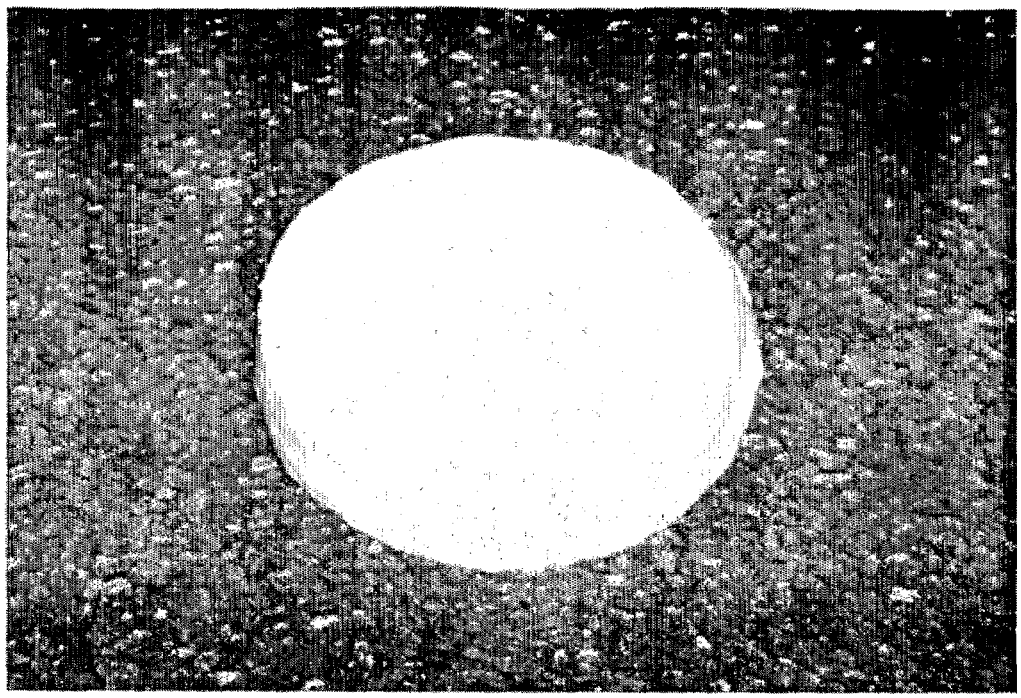
a.
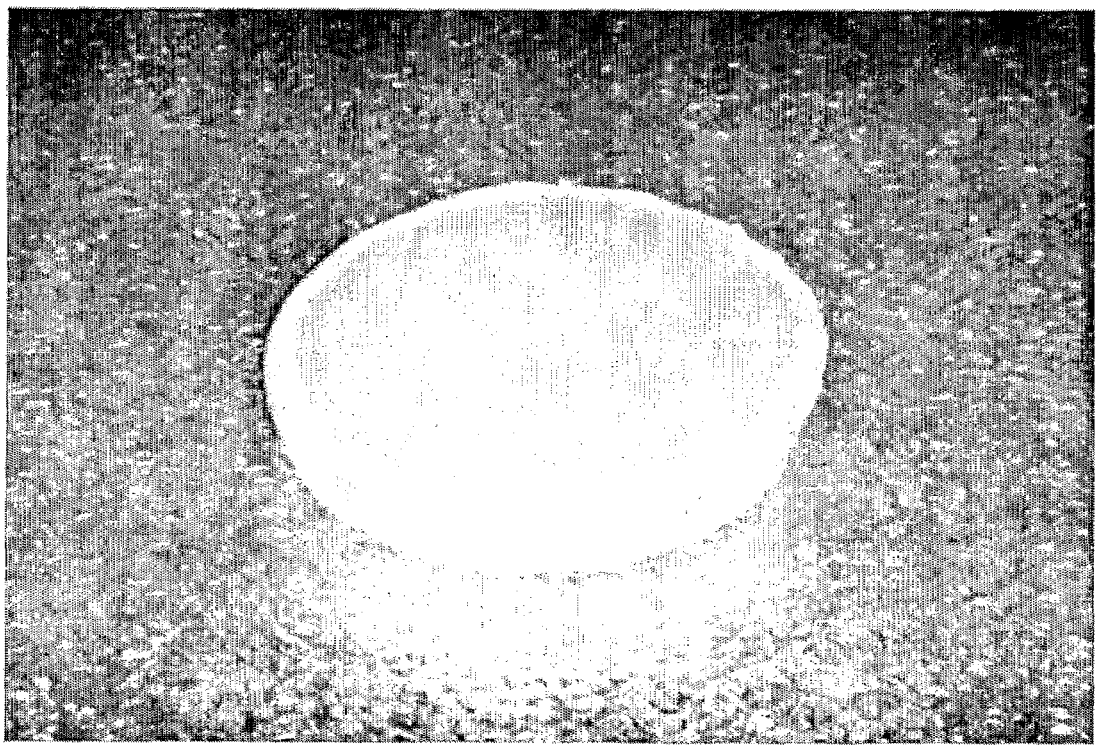
b.
Fig. 18

MODELS AND METHODS OF USING SAME FOR TESTING MEDICAL DEVICES

RELATED APPLICATIONS

This application claims the benefit of U.S. application Ser. Nos. 11/050,161; filed Feb. 3, 2005, 11/098,248 filed Apr. 4, 2005; and 11/172,575 filed Jun. 30, 2005, and 60/749,972 filed Dec. 13, 2005, respectively, which are incorporated herein in their entirety.

BACKGROUND OF THE INVENTION

During the development of any new medical device, various tests may be required, including the characterization of physical properties (geometric, mechanical, electrical, electromagnetic, thermal, chemical, etc), the evaluation of overall device performance (numerical simulation or simulated use testing), or testing to determine the effect of the device on living tissues. These development tests may be broadly classified as either biological tests, theoretical tests, or physical tests, although there are areas where these testing classes overlap one another.

Biological testing generally involves an analysis of the interaction between the device and human or animal tissues. The biological tests that are performed first are generally biocompatibility tests, which evaluate the tendency of the device to cause damage to living tissues by mere presence of the materials comprising the device. Later on in the development cycle, the device may be tested in a live animal (animal study) or a human patient (clinical trial) to determine the ability of the device to perform its intended use and to evaluate safety and efficacy (device performance). Animal studies represent a special type of test known as simulated use testing, so called because the animal is a simulation of the actual use (human) environment.

Theoretical or computational tests may include finite element analysis, kinematic analysis, and computational fluid dynamics. These tests employ knowledge of the physical properties (strength, mass, density, viscosity, etc) of the device and actual use environment to construct a computer model of the device—tissue system. This type of model may then be used to predict device performance, the tendency of the device to fail, and possibly the tendency of the device to cause injury. Of course, these models are limited by the assumptions made in their derivation and the computational power of the computer. Unfortunately, it may be difficult to quantitatively describe a device, and more importantly the actual use environment, in sufficient detail to yield realistic results.

Physical testing essentially evaluates the design of the device. That is, this physical testing may involve; (1) the measurement of device geometry such as lengths, diameters, and wall thicknesses, (2) the measurement of mechanical properties such as tensile strength and stiffness, (3) the measurement of other device characteristics such as color, thermal conductivity, dielectric properties or other properties, or (4) simulation testing involving trial use of the device in some model of the actual use environment. The purpose of this simulation testing is to evaluate the safety (tendency to injure) and efficacy (performance characteristics) of the device, and in general to evaluate the ability of the device to perform it's intended use. As previously stated, animal studies are one important form of simulation test. Other vehicles (the simulated environment) for this type of testing include cadavers (both human and animal) and benchtop fixtures, which are man-made representations of a particular target anatomy.

The new FDA quality system regulation (QSR) now requires testing under simulated or actual use conditions for all nonexempt Class II and Class III medical devices. Not all manufacturers perform actual use (human clinical trial) testing for every medical device, so in these cases simulation testing is definitely a requirement. At least four traditional simulation options are available to meet this requirement, each with its own advantages and drawbacks. These four general approaches (Table I) to simulation testing involve theoretical (computer) models, benchtop (physical) models, cadaver (human or animal) models, and live animal models. Once again, human subjects are also employed in the development of many medical devices, but since humans represent the actual use environment, these tests (clinical studies) are not considered simulation tests.

TABLE I

The four general approaches to simulation testing including the environment and models involved.

| Theoretical Model | Benchtop Model | Cadaver Model | Live Animal |
|---|---|---|---|
| In vitro Theoretical or computational model | In vitro Physical properties model | In vitro Human or animal cadaver | In vivo Animal study |

Typical medical device development schemes generally involve testing early prototypes in simple bench top test fixtures. Feedback from these tests shape the product through design revisions that are subsequently evaluated using the same model. However, since this process is iterative, as the design matures the models that are needed generally become more complex. For example, a new coronary catheter may undergo initial testing in simple plastic tubes, followed by glass models designed to mimic the size and geometry of the coronary vasculature. The product may experience a series of changes resulting from these tests until the designer is satisfied with performance, and once a certain level of confidence is achieved the testing will proceed to the next available model. In the medical device industry this model is generally a live animal.

In practice, the medical device industry typically employs one or more of the four previously mentioned (Table I) model types in simulation testing prior to seeking approval for human use (a clinical trial). Of course, common sense dictates that the model selected be representative of actual use conditions, but only the clinical trial, which is not a simulation test, fully satisfies this criteria. Unfortunately, human subjects are unavailable for use until late in the development cycle due to risk, regulatory, and ethical considerations. A live animal model has therefore traditionally been the next best choice.

Animal models are currently the gold standard of preclinical trial medical device simulated use testing. In fact, the quality of data produced in these studies can be very high, particularly if the proper animal model is selected, the device and protocol are well designed, and the correct number of animals is used. Designed experiments are possible and are commonly employed, but require an increase in the number of animals. These tests are also performed under physiological (for the animal) conditions. Unfortunately, these studies are expensive because of the staff and facilities required to support the work. A registered facility must be contracted to run the study and care for any animals purchased, a surgeon must be retained to perform the required procedures and to generate the study protocol, and the services of a veterinarian, anesthesiologist, and surgical aide are also required. These studies can easily exceed $100,000 in total costs, and grow even more costly as the number of animals is increased.

The inability to test prototype devices on human subjects is the reason medical device developers resort to animal studies in the first place. Still, animal models suffer from a whole range of unique problems, including the many deviations between human and animal anatomy and physiology, the confounding effects of variation between individual animals, and the unpredictability that arises from using a model that is extraordinarily complex.

Animal models may include live canine, porcine, or bovine specimens, among others. While these animals do offer an in vivo environment, their anatomy and physiology differs significantly from that of a human. The great expense and specialized facilities required limit their in-house use. Reproducibility may also be an issue as both inter- and intrasubject variability are difficult to control. Additional considerations include contention with the Animal Welfare Act, the significant expense associated with contracting regulated facilities and medical practitioners, and the risks related to handling biohazardous materials.

To get around these issues, developers tend to gravitate toward simpler and more accessible models such as cadavers and benchtop fixtures. Unfortunately, there tends to be an inverse relationship between the usefulness and complexity of the model employed. For example, cadaver tissues provide an accurate representation of anatomical geometry, but the required chemical preservation greatly alters the physical properties of the tissues. In addition, biological temperatures and flows cannot generally be simulated, subjects are difficult to source and maintain in useful quantities, and an educational institution must almost always be contracted (at considerable expense) to perform the study.

These factors drive early stage medical device developers to simple benchtop fixtures made (usually) in house by the developer. Unfortunately, these models are typically designed by individuals lacking an understanding of anatomy and physiology, and are usually fabricated from typical engineering materials such as metal, glass, and plastic. While an argument may be made that these models are better than nothing, they are certainly not representative of actual use conditions. Furthermore, engineers in general will agree that the quality of test data is dependent on the good logic behind the test protocol and the quality of the model employed. A poor model is therefore more likely to yield misleading data, and a design based at an early stage upon this data is more likely to require correction at a later stage in development.

BRIEF SUMMARY OF THE INVENTION

The use of a poorly conceived model in development testing will lead to reduced product quality, increased development costs, and greatly lengthened product timelines. Fortunately, these failures may be avoided by employing an intelligent development scheme in conjunction with a high quality model. Accordingly, the subject invention pertains to complex synthetic anatomical models that are designed to enable simulated use testing by medical device companies, medical device designers, individual inventors, or any other entity interested in the performance of medical devices. These models are unique in possessing a level of complexity that allows them to be substituted for either a live animal, an animal cadaver, or a human cadaver in the testing of these devices. These models are further characterized by a similarity of geometry, individual component physical properties, and component-to-component interfacial properties with the appropriate target tissue and anatomy.

The model embodiments of the subject invention may serve as a highly sophisticated bench top model that is designed to be used by medical device developers both early and late in the development process. These models mimic not only the geometry of the target anatomy, but also the physical properties of the living tissues that contact the device.

One important feature of certain embodiments of the subject invention is the implementation of synthetic analog materials that can simulate the physical properties of living tissues. These analogs are in most cases hydrogel materials that are designed on the basis of physical tests performed on actual target tissues. For example, a particular analog material might be designed to exhibit a tensile strength close to 10 kPa to mimic a target tissue that exhibits a tensile strength of 10 kPa. One or more components made from these analog materials are then assembled into a configuration that mimics both the size and geometry of the target organ. The resulting bench top model may therefore be described as a synthetic organ, and it will respond to certain physical stimulus (the device) in a fashion that is similar in many respects to the actual organ.

Model embodiments of the subject invention may be nearly as simple to use as a bench top fixture, but provide feedback that is superior in many respects to cadaver tests, animal studies, and even human clinical trials. In fact, a prototype device may be tested not just in terms of device performance, but also in terms of effect on the target anatomy. This is possible because the device interfacing portion of the model is removable, allowing a quasi-histological examination of the target anatomy after each use. In addition, because the models are artificial and mass produced, multiple tests may be performed either under identical conditions or by altering only the test parameters (temperature, flow, contact angle, etc) desired. This capability helps to eliminate the statistically confounding effect of model variation that plagues cadaver, animal, and human subject studies, and also enables the use of designed experiments to explore device-tissue interactions and interactions between various design parameters.

Some embodiments of the subject invention have several advantages over typical bench top fixtures. Some fixtures in use today may be designed to mimic the overall size and geometry of a particular target tissue, and the best of these are also designed to work at body temperature in the presence of fluids. However, the use of engineering materials in the construction of these models make them dissimilar to the target anatomy in a profound way. This calls into question the value of any data collected, even when designed experiments are employed in addition, these models may only be used to predict device performance, not the effect of the device on the target tissue.

In contrast, some embodiments of the subject invention enable a potentially large number of tests to be completed in an environment that is both geometrically and mechanically similar to the target anatomy. These tests may be performed by an engineering technician on a lab bench, but the tests still produce very high quality data. Also, because this data may be generated early in the development cycle, design errors are discovered sooner, leading to a shorter cycle and a reduced development budget. Further, unlike traditional bench top testing, use of embodiments of the subject invention allows the user to predict how a device will actually function in the human body, and since the effect of the device on the target tissue can be predicted by way of the quasi-histological examination, the risk to the patient may be predicted from the beginning of the process.

Use of embodiments of the subject invention also have several advantages over cadaver studies. Cadaver models provide a fairly accurate representation of size and geometry, but the mechanical properties of the target anatomy are altered by death of the subject and by the required tissue preservation techniques. It is impossible to use these models at normal body temperature or in the presence of fluids, and they cannot be employed to accurately predict the physical effect of the device on the target tissue. An educational institution must almost always be contracted (along with a principal investigator) to perform the study, and since the specimens are difficult to source it is common to run only a single test. Biohazards are an additional risk.

In contrast, use of embodiments of the subject invention enables the generation of animal study quality data (in a much greater quantity) using a simple bench top setup that may be used by an engineering technician. The need to contract with research facilities, employ costly medical practitioners, and also any exposure to biohazards is eliminated. In addition, these models may be used at body temperature in the presence of any real or simulated physiologic fluid, and since the device contacting portions of the model may be removed and replaced, an unlimited number of tests may be performed.

Models according to embodiments of the subject invention have several advantages over live animal models. As previously stated, the quality of data produced in these studies can be very high, particularly if the proper animal model is selected, the device and protocol are well designed, and the correct number (more is always better) of animals is employed. However, a registered facility must be contracted to run the study and care for any animals purchased. A surgeon must be retained to perform the required procedures, generate the study protocol, and to ensure approval from the animal care and use committee of the facility. The services of a veterinarian, anesthesiologist, and surgical aide are also required. Needless to say, these studies are very expensive and grow ever more costly as the number of animals is increased. The cost of discovering a design flaw at this stage is very high, possibly causing modification, termination, or repetition of the study. Biohazards are also a significant risk.

In effect, the inclusion of models according to the subject invention in the development process allows the collection of animal study quality performance data (Table II) at a risk level that is normally associated with bench top studies. In fact, by employing this technology early on in the development process, vital feedback on device performance may be collected before erroneous assumptions can adversely affect the design. This capability not only reduces the probability of costly late stage design changes, but also shortens the project timeline and reduces the overall cost of development. In addition, these models may be used in an ordinary laboratory by engineering personnel. The need to own or contract with research facilities, pay for costly medical practitioners, and absorb risks associated with biohazard exposure are all eliminated. An innocent life (the animal) is also spared.

TABLE II

A comparison of the various model types available in industry.

| | Positive Attributes | | | | Negative Attributes | | | Quality Attributes | |
|---|---|---|---|---|---|---|---|---|---|
| Model | Lab Testing Possible | Predict Tissue Damage | Target Anatomy Modeled | Tissue Properties Modeled | Medical Contractors Required | Biohazard Exposure Risks | Live Animal Loss | Data Quality | Relative Expense |
| ARM | X | X | X | X | | | | High | Med |
| Fixture | X | | X | | | | | Low | Low |
| Cadaver | | | | | X | X | | Med | Med |
| Animal | | X | | X | X | X | X | High | High |
| Human | | X | X | X | X | X | | High | Extreme |

These and other advantageous aspects of the subject invention are described in the detailed description below, description of the drawings, and the appended claims.

BRIEF DESCRIPTION OF THE DRAWINGS

FIG. 2 shows a perspective view of one embodiment of the subject invention directed to a luminal structure simulating a femoral artery.

FIG. 3 shows a perspective view of one embodiment of the subject invention directed to a luminal structure model simulating vasculature.

FIG. 7A-B are photographs showing fixtures for bench top testing in accord with the teachings herein.

FIG. 9 are photographs representing the impact of a device on a tissue analog is illustrated in FIG. 9A-C

FIG. 12 shows a perspective view of an luminal structure embodiment comprising a lumen lined with living cells and comprising nourishment delivery channels.

FIG. 13 shows a cross-sectional view of the 3-3 plane of the embodiment shown in FIG. 2.

FIG. 14 shows a cross-section view of the 4-4 plane of the embodiment shown in FIG. 2.

FIG. 16 shows a top (a) and bottom (b) perspective view of a femoral puck embodiment.

FIG. 17 shows a longitudinal cross-section (a) and a transverse cross-section (b) of another luminal embodiment that is implemented to grow cells on its luminal wall.

FIG. 18 shows a photograph of a femoral puck embodiment, top perspective view (a) and bottom perspective view (b).

DEFINITIONS

Figure 1:
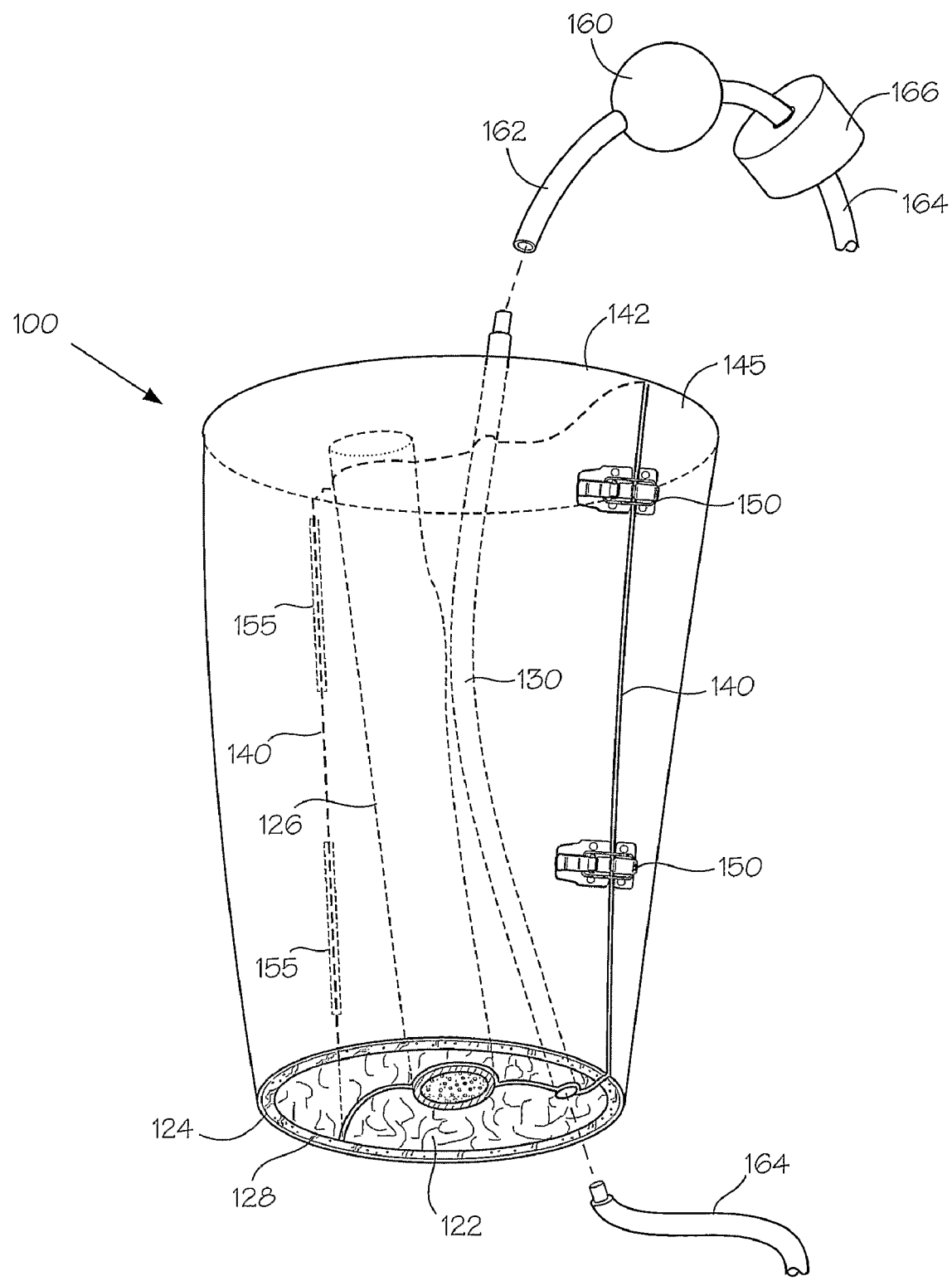
FIG. 1 shows a perspective view of one embodiment of the subject invention directed to a femoral artery model.

It is important to an understanding of the present invention to note that all technical and scientific terms used herein, unless defined herein, are intended to have the same meaning as commonly understood by one of ordinary skill in the art. The techniques employed herein are also those that are known to one of ordinary skill in the art, unless stated otherwise. For purposes of more clearly facilitating an understanding the invention as disclosed and claimed herein, the following definitions are provided.

The term "analog material" as used herein refers to a material or combination of materials designed to mimic one or more physical properties of a relevant target tissue. Analog materials may include, but are not limited to, hydrogel, silicone rubber, natural rubber, other thermosetting elastomers, other thermoplastic elastomers, acrylic polymers, other plastics, ceramics, cements, wood, styrofoam, metals, actual human tissues, actual animal tissues, and any combination thereof. Each component part in model embodiments may be constructed from one or more analog materials.

The term "hydrogel(s)" as used herein refers to a unique class of materials that contain a large amount of water and generally exhibit a high degree of elasticity and lubricity. These materials are ideal for simulating the physical properties of many living soft tissues. Hydrogels are materials that are wettable and swell in the presence of moisture and retain water without dissolving. These materials are generally constructed of one or more hydrophilic polymer molecules, although copolymerization with hydrophobic monomers may also lead to the formation of a hydrogel. These materials are generally elastic, and exhibit a three-dimensional network that is either crosslinked directly by chemical bonds or indirectly through cohesive forces such as ionic or hydrogen bonding.

The term "luminal structure" refers to any structure in the body through which a substance flows through, including, but not limited to, the arterial and venous vasculature anywhere in the anatomy, the trachea, the sinuses, the oral cavity, the esophagus, the urinary tract, the ear canal, certain portions of the male and female reproductive system, the bile ducts, other portions of the digestive system, and any other part of the anatomy that resembles a luminal structure or cavity. Depending on the context in which the term luminal structure is used herein, it may refer to a representative anatomical structure in a living or deceased animal (i.e., native structure), or may refer to an artificial luminal structure intended to model such native structure. As described herein, artificial luminal structure may actually pertain to a luminal structure removed from a living or deceased animal but which is used as a model.

Accordingly, the term "geometrically mimic" as used herein refers to configurations of models that comprise a similar geometric feature of the target anatomical structure to be mimicked, such as length, width, diameter, thickness, cross-section, and/or, in most cases general shape of a particular target anatomy.

The term "lumen possessing human or nonhuman anatomical structure" as used herein refers to any anatomical structure that comprises as one of its features a lumen. In its most basic sense it is directed to the actual luminal structure itself such as a vessel, duct, tract, passage, orifice, airway, etc., as found in an a human or nonhuman animal. It may also be directed to a section of the anatomy that comprises a luminal structure cooperative with other tissue(s). For example, in no way intended to be limiting, it may pertain to a structure generally shaped like an organ, such as a heart, having luminal structures cooperative to the exterior and/or interior of the structure, such as in a heart example, the coronary arteries and aorta. In another example, not intended to be limiting, but merely for illustrative purposes, it may be a limb or a portion thereof, that contains within it one or more major blood vessels. In another example it may be a torso of a human body that has major blood vessels, ducts, and/or tracts comprised within.

The term "data value" as used herein refers to a numerical value that is representative of a measurement of one or more physical characteristics. The numerical value is typically provided in a unit of measurement obtained from observation of a specimen under a defined set of conditions.

The term "human or non-human animal tissue" as used herein refers to the one or more tissues that constitute a human or non-human animal anatomical structure.

As used herein the term "human or non-human animal anatomical structure" refers to one or more tissue structural components that make up a part of anatomy of a human or non-human animal. A part of anatomy may include, but is not limited to, whole organs, parts of an organ, or a section of a body comprising one or more tissue types, organ types, and/or part of organ(s).

The term "cell seeded portion" refers to a portion of a model embodiment that comprises living cells disposed within or on a substrate, or both. Typically, the cell seeded portion is a layer which is intended for direct contact by a medical device, pharmaceutical, or consumer product during the testing of such device or product.

The term "substrate" refers to a structural support upon and/or into which living cells may be disposed. A substrate may comprise a layer or portion of an embodiment comprised of an analog material. Substrates may have little or no porosity which would typically provide a surface upon which cells are disposed or have increased porosity thereby allowing cells to integrate into the substrate.

In certain model embodiments, one or more components may be cooperative with other one or more components. The term cooperative in this context means that such cooperative components are contiguous, engaged, or integrated with one another. Further, components cooperative with one another may be designed to be dissociable, i.e., removably cooperative.

DETAILED DESCRIPTION

The interaction of a foreign body with living tissues results in complications that are related to, among other things, shear forces, normal forces, abrasive action, blunt trauma, pressure necrosis, or other physical insults caused by the invading device. Not only are studies to predict the long-term effect of this invasion difficult and expensive to conduct, but when live patients are involved the studies often yield inconclusive results. As an alternative to using these patients, a bench top model may be employed to physically simulate the insult to the tissue as a relatively inexpensive, easily repeatable, and logical first step before resorting to animal studies and clinical trials. However, for this approach to be productive, the model employed must be representative of the actual target anatomy in which the medical device will normally be used.

The subject invention pertains to complex synthetic anatomical models that are designed to enable simulated use testing by medical device companies, medical device designers, individual inventors, or any other entity interested in the performance of medical devices. These models are unique in possessing a level of complexity that allows them to be substituted for either a live animal, an animal cadaver, or a human cadaver in the testing of these devices. These models are further characterized by a similarity of geometry, individual component physical properties, and component-to-component interfacial properties with the appropriate target tissue and anatomy.

The model embodiments of the subject invention create a test environment similar in many ways (mechanical properties, physical properties, temperature, flow rate, viscosity, etc) to that of a living animal. In addition, individual tests may be repeated as many times as desired under identical or (if desired) altered conditions. Also, the tissue-contacting portion of the model may be removed to allow a quasi-histological examination to be performed after each test, an important feature that allows the engineer to predict the tendency of a particular device to inflict injury (or other effect) on the patient.

A study employing the models of the subject invention allows the generation of data that is comparable, and in some ways superior to that of an animal study. Furthermore, since these studies employ a reproducible model, the statistically confounding effect of variation between animals is eliminated. The ability to perform truly reproducible tests allows interactions between the device and the model, as well as interactions between multiple design parameters to be evaluated, a task which is nearly impossible with an animal study. In addition, the expense related to the purchase and housing of animals, contracting registered facilities, and retaining medical practitioners is eliminated. The risks associated with biohazards are also eliminated and a number of innocent animals are spared.

Available benchtop fixtures are designed to mimic the general size and geometry of a target tissue, and the best of these are also designed to work at body temperature in the presence of fluids. However, the typical use of engineering materials in their construction makes these common models dissimilar to the target anatomy and calls into question the value of any data collected using them, even when designed experiments are employed. In addition, these models may only be used to predict device performance, not the effect of the device on the target tissue.

In comparison, the model embodiments of the subject invention enable for the first time a potentially large number of tests to be completed and repeated under identical conditions in an environment that is both geometrically, mechanically, and physically similar to the target anatomy. An engineering technician may perform these tests on a simple benchtop setup, while still generating very high quality of data. Also, because this data is provided early in the development process, design errors may be discovered earlier; leading to a shorter development cycle and a reduced development budget. Finally, since the effect of the device on the target tissue can be predicted, device quality is improved.

Available cadaver models can provide a fair representation of anatomical geometry, but the mechanical and physical properties of the target anatomy are altered by preservation techniques. It is impossible to use these models at normal body temperature or in the presence of test fluids, and they cannot be employed to accurately predict the physical effect of the device on the target issue. An educational institution must generally be contracted, along with a principal investigator, to perform the study, and since the specimens are difficult to source it is common to run only a single test. Biohazards are an additional risk.

In comparison, certain model embodiments of the subject invention facilitate the generation of animal study quality data using a simple benchtop setup that can be used by an engineering technician. These models may be used at body temperature in the presence of any real or simulated physiologic fluid, and since the device contacting portions of the model may be removed and replaced, an unlimited number of tests may be performed. The need to contract with research facilities, employ costly medical practitioners, and expose staff to the risks associated with biohazards are eliminated.

Certain models of the subject invention are characterized by a similarity of geometry, of individual component physical properties, and of component-to-component interfacial properties with living tissue. On the simplest level, individual model components are fabricated such that they mimic the geometry of a particular target anatomy.

The geometric data needed for fabrication is typically obtained in two ways. The traditional approach is to obtain data from the literature on morphology or from cadaver measurements. While not a bad approximation, this method is time-consuming and permits a large degree of error. A better method would be to get the geometric data directly from a patient or from sources such as the Visible Human Project.[2]

After collecting the appropriate geometric data, the individual model components may be fabricated from appropriate analog materials. Depending on the complexity of the part and the type of materials used, the individual component might be molded, extruded, or machined. For complex geometries, however, these techniques may become cumbersome and expensive. In these cases rapid prototyping techniques such as stereolithography offer a relatively inexpensive alternative. Techniques are being developed that allow actual patient data (obtained from MRI or spiral-CT images) to be fed directly into the rapid prototyping system, thus replicating the patient's anatomy exactly. This technology allows for the production of extremely realistic simulations.

Certain models of the subject invention are constructed from multiple components, and these individual components are fabricated in such a way that they mimic the geometry (length, width, diameter, thickness, cross-section, shape, etc) of a particular portion of the target anatomy that is relevant to the medical device under test.

Certain analog materials used to manufacture the individual components of the subject invention are formulated to exhibit one or more physical characteristics of a target living tissue such as, but not limited to, uni-axial or multi-axial tensile strength or modulus, uni-axial or multi-axial compressive strength or modulus, shear strength or modulus, coefficient of static or dynamic friction; surface tension; wettability; water content; electrical resistance and conductivity; dielectric properties; optical absorption or transmission, thermal conductivity, porosity, moisture vapor transmission rate, chemical absorption or adsorption; or combinations thereof. Each analog material is designed so that the physical properties of the analog will match the physical properties of the relevant tissue on which the analog is based. More specifically, each analog material is formulated so that the physical property or properties of the analog fall within a range that 50% or more similar to the targeted physical property or properties of the relevant living tissue on which the analog material is based.

The aforementioned listed physical characteristics are well understood, and may be determined by well-established techniques. References teaching the determination of different physical properties (in no way intended to be an exhaustive list) include the following:
(1) Shigley, J. E., and Mischke, C. R. *Mechanical Engineering Design*, 5th Ed., McGraw-Hill, 1989.
(2) Harper, C. A., *Handbook of Materials for Product Design*, 3rd Ed., McGraw-Hill, 2001.
(3) Askeland, D. R., *The Science and Engineering of Materials*, 2nd Ed., PWS-Kent, 1989.
(4) LaPorte, R. J., *Hydrophilic Polymer Coatings for Medical Devices*, Technomic Publishing,
(5) Hayt, W. H., and Kemmerly, J. E., *Engineering Circuit Analysis*, 4th Ed., McGraw-Hill, 1986.
(6) Park, J. B., and Lakes, R. S., *Biomaterials An Introduction*, 2nd Ed., Plenum Press, 1992.
(7) Lindenburg, M. R., Editor, *Engineer in Training Manual*, 8th Ed., Professional Publications, 1992.

Particular teachings of certain physical properties are noted (references numbers related to preceding list):

Tensile strength and modulus, both measured in Pascal (Pa)—Ref 1, pg 186.

Compressive strength and modulus, both measured in Pascal (Pa)—Ref 2, pg 718.

Shear strength and modulus, both measured in Pascal (Pa)—ASTM Standard D3165-00, Standard Test Method for Strength Properties of Adhesives in Shear by Tension Loading of Single-Lap-Joint Laminated Assemblies.

Coefficient of static and dynamic friction, a dimensionless number—Ref 7, pg 445.

Surface tension, measured in dynes/cm—Ref 6, pg 57.

Wettability, measured in terms of contact angle (degrees)—Ref 4, pg 3.

Water content, measured in mass percent (%)—Ref 4, pg 41.

Electrical resistance and conductance, measure in ohm for resistance and mho for conductance—Ref 5, pg 25.

Dielectric properties, measured in various units—ASTM Standard E2039-04 Standard Test Method for Determining and Reporting Dynamic Dielectric Properties.

Optical absorption and transmission, measured in $cm^{-1}$—Ref 3, pg 739.

Thermal conductivity, measured in cal/(cm-s-C)—ASTM Standard D5930-01 Standard Test Method for Thermal Conductivity of Plastics by Means of a Transient Line-Source Technique.

Porosity, measured in percent (%)—Ref 3, pg 490.

Moisture vapor transmission rate, measured in g/(mil-$in^2$)—Ref 2, pg 941.

The individual components of the subject invention are assembled in such a way that the interaction between adjacent components yields the overall interaction expected in the actual target tissue. That is, the interfacial properties (bond strength, component-to-component friction, etc) between the various model components are designed to simulate the interaction between the relevant tissues in the target anatomy.

In designing particular embodiments of the subject invention, the relevant anatomy may be conceptually divided into discrete sections that will form the individual components of the model. For example, a model of the femoral artery might employ at least two (and possibly many more) analog materials: one for the femoral artery component and one for the supporting tissue component. Furthermore, these analog materials are formulated to mimic one or more properties of the target tissue. This generally involves implementation of two design parameters (modeled properties and data source) to be determined.

The first design parameter typically entails selecting physical properties that are important for the analog material to mimic in the decided application. These properties will vary depending on the type of device under test, the target anatomy, and the general objective of the testing. For example, if one objective is to determine the tissue damage caused by a device tracking through the femoral artery it would be advantageous to include abrasion resistance in the properties list. In addition, if a further objective is to simulate the tendency of the device to penetrate the artery wall then penetration resistance or shear strength might be included in the list as well. Any number of properties may be included in the target properties list, but it should be noted that as this list gets longer it becomes progressively more difficult to satisfy all of the design requirements. In fact, in typical embodiments, if a particular component requires an analog material with more than three target properties it might be better to separate the components into multiple parts.

The second design parameter typically involves selecting the source of the physical properties data. That is, it should be determined if the model will be based on human or animal (or both) tissue properties. Once this is determined, the data may either be drawn from the literature or generated directly by performing the appropriate physical tests on actual samples of the target tissues. The most common tissue sources for non-human properties tests are the sheep and pig, but other animal sources are possible as well.

In one embodiment, once the geometry, target properties, and source animal have been selected, tissue testing may commence. Using the very simple femoral artery model brought up as an illustrative example, the model could consist of at least two structural components (artery and support tissue) made from two different analog materials. If it is assumed for the sake of this discussion that the model will be used to evaluate abrasive tissue damage and ease of device passage through the artery, and further assumed that the analog materials will be designed around porcine tissue properties, then a pig must be sourced and sacrificed to produce the required samples for testing. It is important to note that tissues begin to degrade immediately after death so preserved samples ideally should not be used for this purpose. The tests performed on the tissue samples may include abrasion resistance, shear strength, and lubricity, but other tests might be included as well.

The data collected from this testing regime will be used as a target in the design of the analog materials, and the design intent is that these analog materials exhibit physical properties that mimic the physical properties of the target tissue samples. After the materials are formulated their performance will be verified by repeating the same physical properties tests that were performed on the original tissue samples on the newly formulated analog material samples. Of course, these tests must be performed under conditions as reasonably similar as possible to the original (tissue sample) tests.

Part of the design process involves prioritizing the various target properties for the synthetic analog materials. Less important properties should be placed farther down the list and given a lower priority during the formulation process. This is typically, though not necessarily, required because the design becomes progressively more difficult to produce as the number of modeled properties increases. The number of target properties are preferably limited to three or fewer. If more complex model behavior is required than this restriction will allow, then the number of components can be increased instead. For example, the artery might by constructed from three two-property analog materials instead of one three-property analog. Typically, a component comprised of several analogs will exhibit a more complex (and realistic) response than a component constructed from a single (multi-property) analog. In the case of the femoral artery model, the artery component itself is preferably composed of two or three different analog materials. The model may also employ multi-part components for skin, fat, muscle, and bone.

The choice of materials used in a constructing the model will to a large extent determine how realistically the model simulates the in vivo environment. For example, many medical device companies presently use glass tubing to mimic portions of the cardiovascular system; however, glass is obviously more rigid than most biological tissues and tends to be much smoother than the luminal structural surface of diseased, or even healthy, blood vessels. Consequently, a catheter will behave much differently in a glass model than in an actual blood vessel.

The composition of individual analog materials is unimportant as long as the relevant properties are accurately modeled. Typical engineering materials, including many metals, ceramics, and plastics commonly employed in industry may be used depending on the required analog properties. However, in cases where soft tissues are being modeled it will generally be advantageous to use nonstandard materials such as hydrogels. These materials swell in the presence of moisture and can retain large amounts of water without dissolving. They are constructed of one or more hydrophilic polymer molecules, although copolymerization with hydrophobic monomers may also lead to the formation of a hydrogel. These materials are generally elastic, and exhibit a three-dimensional network that is either crosslinked directly by chemical bonds or indirectly through cohesive forces such as ionic or hydrogen bonding. Hydrogels are particularly advantageous in this application because the formula may be manipulated to give a combination of water content, lubricity, abrasion resistance, and other properties characteristic of living soft tissues. In this respect these materials are particularly suited to modeling fragile tissues such as venous or arterial intima and ciliated epithelia. Hydrogels also provide an ideal substrate for maintaining a surface of live cells if so desired.

Certain embodiments of models of the subject invention employ a wide variety of hydrogel materials, including but not limited to polyvinyl alcohol, polyvinyl pyrrolidone, polyethylene oxide, and polyhydroxyethyl methacrylate. This entire class of materials is physically more tissue-like simply by nature of incorporating water, but by carefully controlling such parameters as molecular structure, density, wall thickness, durometer, and many other physical properties and characteristics a good match between the actual tissue and analog material may be achieved.

Poly(vinyl alcohol) is normally produced by the acid-catalyzed hydrolysis of poly(vinyl acetate), which effectively converts the pendant acetate groups to hydroxyl groups. The properties of the resulting polymer are determined by tacticity, degree of hydrolysis, and molecular weight. Most commercial grades of PVA are stereoregular (primarily isotactic) with less than 2% of the repeat units forming in the 'head-to-head' (adjacent hydroxyl groups) configuration. In theory this should allow a high degree of crystallinity in the finished product. However, this is hindered by the presence of residual acetate groups so the tendency toward crystallization depends primarily on the degree of hydrolysis. This refers to the percentage of converted acetate groups on the main chain. Partially hydrolyzed grades (less than 75% conversion) do not crystallize significantly and are soluble in water at room temperature. This is because the large number of bulky acetate groups increases free volume and prevents the long-range interchain associations required for crystallization to occur. As the degree of hydrolysis increases the loss of bulky acetate groups reduces free volume and the chains are allowed to more closely approach one another. The compact but highly polar hydroxyl groups then come into close proximity and 'bind' the chains together through strong hydrogen bonding. These interchain forces increase the degree of crystallinity and greatly reduce solubility. In fact, in spite of the high concentration of hydroxyl groups completely hydrolyzed grades of PVA should be heated to nearly 10° C. to attain solution. These materials exhibit excellent mechanical properties and chemical resistance and also swell to a significant degree.

The properties of PVA hydrogels vary with molecular weight, but since these materials are normally obtained in polymer form the molecular weight cannot easily be adjusted. Instead these properties are typically modified by means of chemical or physical crosslinking. Chemical gels are easily formed by the addition of agents which undergo condensation with the hydroxyl groups on the main chain. A number of aldehydes (glutaraldehyde, formaldehyde, etc.), dicarboxylic acids (adipic acid, terephthalic acid, etc.), and metal ions ($Fe^{3+}$, $B^{5+}$, etc.) will form chemical bonds with PVA which result in crosslinks. Longer molecules such as diacids are generally preferred over metal ions because the ion 'bridge' is short and restrictive, embrittling the material. Molecules such as adipic acid can effectively restrict chain mobility while maintaining some measure of flexibility.

The orientation of a given gel material may be induced by drawing the material, by heat treatment, or by casting the polymer in solution with a gelling agent. These agents create specific interactions between the hydroxyl groups on adjacent chains, bringing them together to improve hydrogel bonding. Many such agents are known, and this process is easily employed on a laboratory scale. This is the method the author employed for the fabrication of PVA gels used in this study. The process (Table III, see Example 1 below) is very simple and basically only involves dissolving the polymer in a solution of water and the gelling agent, dimethyl sulfoxide (DMSO). This solution will spontaneously gel over several hours at room temperature or when chilled. The properties of the resulting gel depend on the molecular weight and concentration of the polymer in solution, as well as the concentration of the gelling agent. Increasing the concentration of the agent tends to improve mechanical strength, but also reduces swelling. At any rate, the amount of gelling agent should be minimized because it must be extracted prior to use.

Validation of embodiments of the subject models is, in most cases, a desired objective. First, it will help determine the degree of realism of the simulation—in other words, how accurately the simulation performs compared to the in vivo environment. If the intent is to simulate blood flow in the carotid artery, for example, one type of validation would reveal how flow rate in the simulation compares to the flow rate in the patient.

Validation also identifies the limitations of the simulation. Especially in theoretical simulations, it is important to understand not only the accuracy of the model but also the circumstances under which it breaks down. A simulation might be highly accurate under normal situations, but if an abnormality is introduced, the simulated results might not be representative of a similar abnormality in vivo. Finally, if data from the simulation will be used in support of an FDA submission, it is even more important that the simulation be validated. The stronger the validation, the stronger the submission.

In general, three validation strategies are available: quantitative, qualitative, and indirect. Quantitative validation involves collecting numerical data from the simulation and comparing it to data collected in vivo under similar conditions. Collecting quantitative data usually involves the use of instrumentation—for example, pressure transducers to record simulated blood pressure. Common diagnostic technologies such as ultrasound or MRI might also be used. Of course, technologies such as ultrasound are designed for use on biological tissue, and since the simulation will probably be made of inert materials, some modifications may be necessary, as those skilled in the art will appreciate in view of the teachings herein.

In qualitative validation, experienced users (usually clinicians) use the device in the simulation following the same protocols they would follow when using the product in a patient. After the simulated procedure, users convey in as much detail as possible how the device performed in comparison to their experience of using a comparable device in a patient. To test a new product, the manufacturer should identify current users of similar products. For obvious reasons, users having the most clinical experience will typically yield the best results. When used properly, the "touchy-feely" data generated in the qualitative validation are as important as the numerical data obtained from the quantitative validation.

Indirect validation involves the comparison of physical performance data from the model to the actual use environment. This is the type of validation that is integral to the design process for Animal Replacement Models. The basic logic behind this form of validation is that if the individual model components exhibit properties similar to the target tissues then the model as a whole will exhibit performance similar to the synthetic organ being constructed. This type of validation will typically be followed by other tests once the model is completely constructed.

A strong validation strategy involves a combination of all of these techniques. Conducting only one type of validation leaves open the possibility that some important piece of information has been missed. When used together, the results help maximize the accuracy and degree of realism of the simulation.

Certain model embodiments of the subject invention comprise features that make them valuable for medical device design and development testing. First, since the models are designed to respond to physical stimulus in a fashion similar to the target (human or animal) anatomy, device performance in the model may be used to predict device performance in the target anatomy. Second, the device interfacing portion of the model may be removed for quasi-histological examination, allowing the effect of the device on the target anatomy to be measured. This is particularly important because it allows the potential for injury to be predicted. Third, because the device interfacing portion of the model can be removed and replaced, a large number of tests can be performed under either identical or varying conditions as desired. This would allow the generation of descriptive statistics on device performance and the execution of meaningful designed experiments, both of which are impossible with live animals or cadavers. Fourth, if a hydrogel substrate is employed to support a living tissue bed, the effect of the test device on actual living cells can be predicted. Fifth, the models may be equipped with pumps, heaters, and other accessories to more accurately model almost every aspect of actual use conditions. Sixth, the models may be equipped with sensors that allow the measurement of device influences such as applied force and pressure on portions of the target anatomy. Also, these models provide a wide range of cost, safety, and logistical benefits to device developers compared to existing benchtop models, cadavers, and live animals.

Luminal Structure Embodiments

In one embodiment, the subject invention pertains to artificial anatomical models that geometrically mimic an anatomical structure comprising a luminal structure.

In another embodiment, the subject invention contains a luminal structure with segments or portions thereof that are constructed from hydrogel material. Alternatively, the entire luminal structure may be constructed from hydrogel material.

In yet another embodiment, the subject invention is directed to a luminal structure with segments or portions thereof that are constructed from standard engineering materials, but that are coated on the interior (medical device contacting) portion of the luminal structure with a hydrogel or hydrophilic material.

In a specific embodiment, the subject invention contains a luminal structure with segments or portions thereof that are constructed from either standard engineering materials or hydrogel materials, but with supporting (non-device contacting) structures constructed from hydrogel materials.

Manufacture of Model Embodiments

In one embodiment, the subject invention pertains to a process for producing tissue analog materials useful for testing medical devices. The method embodiment comprises evaluating at least one physical characteristic of a living human or non-human animal tissue under predetermined test conditions to thereby generate a first physical characteristic data value. A tissue analog material is fabricated that is intended to simulate the living non-human animal tissue. At least on physical characteristic of the tissue analog material corresponding to the at least one physical characteristic of the living non-human animal tissue is evaluated to generate a second physical characteristic data value. The first and second data values are compared to determine whether the tissue analog material sufficiently simulates the living non-human animal tissue.

Living human or non-human tissue may be evaluated in vivo, in situ, ex vivo, or ex situ. In vivo testing refers to testing of tissue in a living body. In situ testing refers to testing of a tissue in its natural position. In situ may include in vivo testing or may relate to testing of a structural component of tissue (live or dead) contained in its natural position within a larger section of anatomy that has been removed from a living or non-living body. Ex vivo testing refers to testing of living tissue outside of a living body. Ex situ refers to testing of a tissue occurring outside a natural position of said tissue. Accordingly, embodiments of the invention contemplate the evaluation of living or non-living tissue. In most cases, it is preferred that evaluation of living tissue is conducted to obtain a first data value of one or more physical characteristics. It is thought that such evaluation will obtain a data value of one or more physical characteristics that most closely resembles the physical characteristics of the tissue in its natural, living environment and will thus serve to create the highest integrity of simulation that is enabled by tissue analog materials for the testing medical devices.

Under current ethical guidelines and considerations, the obtention of data values from living human tissue, though in most instances preferred, may be difficult. Because of not being as constrained by such ethical considerations, evaluation of living tissue in living non-human animals in most cases is less difficult to conduct. In a specific embodiment, the subject invention pertains to a method of producing a tissue analog material that involves the evaluation of at least one physical characteristic of a living tissue of a living non-human animal to obtain a first data value. A plurality of analog material candidates are fabricated intended to simulate said living tissue with respect to said at least one physical characteristic. The analog material candidates are evaluated under test conditions to obtain second data values for corresponding physical characteristic(s) for each analog candidate, respectively. The second data values are compared to the first data value to identify tissue analog materials that sufficient simulate the living tissue. The resulting analog materials may then be assembled into a configuration that geometrically mimics either the human animal or non-human animal anatomy.

Tissue may be evaluated to obtain data value(s) for one or more characteristics by conducting tests or by referring to known and/or published data values previously performed. As more and more tests are performed, a collection of values will be produced which may be referred to in evaluating newly fabricated analog material candidates. This collection of values and related information may be assembled in an accessible database.

In a specific embodiment, the tissue analog material is determined to sufficiently simulate the non-human animal tissue when the second data value is no more than 50 percent greater than or less than the first data value. In another embodiment, the tissue analog material is determined to sufficiently simulate the non-human animal tissue when the second data value is no more than 40 percent greater than or less than the first data value. In another embodiment, the tissue analog material is determined to sufficiently simulate the non-human animal tissue when the second data value is no more than 30 percent greater than or less than the first data value. In yet another embodiment, the tissue analog material is determined to sufficiently simulate the non-human animal tissue when the second data value is no more than 20 percent greater than or less than the first data value.

According to another embodiment, the subject invention is directed to a process for producing a tissue analog material useful in a model for testing a medical device. The process includes (a) obtaining a first data value pertaining to at least one physical characteristic of a target human or non-human animal tissue; (b) fabricating a plurality of analog material candidates intended to simulate the at least one physical characteristic of the target human or nonhuman animal tissue; (c) obtaining second data values pertaining, respectively, to at least one physical characteristic of the tissue analog material candidates that correspond to the at least one physical characteristic of the target human or non-human animal tissue; and (d) identifying an analog material candidate whose second data value is no more than 50 percent lesser or greater than the first data value.

In a further embodiment, the subject invention is directed to a method of testing a device designed for use on a target tissue in a human or non-human animal. The method includes obtaining an artificial anatomic model configured to geometrically mimic at least one target human or non-human anatomical structure, the artificial anatomic model comprising at least one tissue analog material designed to simulate at least one physical characteristic of a target human or non-human animal tissue; wherein the tissue analog material is produced by (a) obtaining a first data value pertaining to the at least one physical characteristic of the target human or non-human animal tissue; (b) fabricating a plurality of analog material candidates intended to simulate the at least one physical characteristic of the target human or non-human animal tissue; (c) obtaining second data values pertaining, respectively, to at least one physical characteristic of the tissue analog material candidates that correspond to the at least one physical characteristic of the target human or non-human animal tissue; and (d) identifying an analog material candidate whose second data value is no more than 50 percent lesser or greater than the first data value to thereby obtain the tissue analog material; impacting said at least one tissue analog material with said device; and evaluating an affect of said impacting on said at least one tissue analog material.

Model Embodiments Comprising Living Cells

According to another embodiment, the subject invention pertains to model embodiments that comprise living cells, wherein the models may serve as highly sophisticated bench top models that are designed to be used by medical device, pharmaceutical, and consumer product developers both early and late in the development process. These models mimic not only the geometry of the target anatomy, but also the physical characteristics of the living tissues that comprise this anatomy.

In yet another embodiment, the invention pertains to a method of testing a medical device, pharmaceutical, or consumer product on a subject, wherein the use of said device or product impacts on a tissue in said subject. The method may include the following steps: producing a model comprising two or more contiguous layers, said two or more layers comprising at least one layer comprising living cells; contacting said at least one layer comprising living cells with said device or product; and evaluating affect of said contacting step on said at least one layer comprising living cells.

In a further embodiment, the invention pertains to a model designed for testing a medical device, pharmaceutical, or consumer product, said model may include an artificial anatomic structure configured to geometrically mimic a human or animal anatomic structure; analog material employed by said artificial anatomic structure designed to simulate at least one predetermined physical characteristic of a target tissue, and at least one portion comprising living cells disposed therein or thereon, or both.

According to another specific embodiment, the subject invention pertains to a method for producing a model designed for testing a medical device wherein the method includes (a) providing a substrate shaped to geometrically mimic a human or nonhuman animal anatomical structure; (b) contacting said substrate with cells capable of adhering thereto, thereby forming a cell-seeded portion of said model; and (c) maintaining said cell seeded portion for a growth period in a fluid media suitable for growth of said cells.

A cell seeded layer for certain model embodiments may be seeded with any of a variety of cells. Individual cells on the seeded surface may be either separate from one another (sparsely populated surface) or may form a contiguous surface of living tissue (densely populated surface). A "cell", according to the present invention, is any preparation of living tissue, including primary tissue explants and preparations thereof, isolated cells, cells lines (including transformed cells), and host cells. Any preparation of living cells may be use to seed the substrate for cell seeded layer. For example, cultured cells or isolated individual cells may be used. Alternatively or additionally, pieces of tissue, including tissue that has some internal structure, may be used. The cells may be primary tissue explants and preparations thereof, cell lines (including transformed cells), or host cells.

Examples of cells that can be seeded or cultured on the substrate include, but are not limited to, epidermal cells, ciliated epitherlial cells, bone marrow cells, smooth muscle cells, stromal cells, stem cells, mesenchymal stem cells, endothelial precursor cells, synovial derived stem cells, embryonic stem cells, blood vessel cells, chondrocytes, osteoblasts, precursor cells derived from adipose tissue, bone marrow derived progenitor cells, kidney cells, intestinal cells, islets, beta cells, Sertoli cells, peripheral blood progenitor cells, fibroblasts, glomus cells, keratinocytes, nucleus pulposus cells, annulus fibrosus cells, fibrochondrocytes, stem cells isolated from adult tissue, oval cells, neuronal stem cells, glial cells, macrophages and genetically transformed cells or combination of the above cells.

Any available methods may be employed to harvest, maintain, expand, and prepare cells for use in the present invention. Useful references that describe such procedures include, for example, Freshney, Culture of Animal Cells: a Manual of Basic Technique, Alan R. Liss Inc., New York, N.Y., incorporated herein by reference.

Methods of isolating and culturing such tissue-producing or -degrading cells, and/or their precursors, are known in the art (see, for example, Vacanti et al., U.S. Pat. No. 5,041,138; Elgendy et al., Biomater. 14:263, 1993; Laurencin et al., J. Biomed. Res. 27:963, 1993; Freed et al., J. Cell. Biochem. 51:257, 1993; Atala et al., J. Urol. 150:745, 1993; Ishaug et al., J. Biomed. Mater. Res. 28:1445, 1994; Chu et al., J. Biomed. Mater. Res. 29:1147, 1995; Thomson et al., J. Biomater. Sci. Polymer Edn. 7:23, 1995, each of which is incorporated by reference).

For example, mesenchymal stem cells, which can differentiate into a variety of mesenchymal or connective tissues (including, for example, adipose, osseous, cartilaginous, elastic, and fibrous connective tissues), can be isolated, purified, and replicated according to known techniques (see Caplan et al., U.S. Pat. No. 5,486,359; Caplan et al., U.S. Pat. No. 5,226,914; Dennis et al., Cell Transplantation 1:23, 1992, each of which is incorporated herein by reference). Such mesenchymal cells have been studied in association with tricalcium phosphate and hydroxyapatite carriers and have been found to be capable of successful differentiation from within such carriers (see Caplan et al., U.S. Pat. No. 5,197,985, incorporated herein by reference). Similar procedures are employed to direct mesenchymal cell differentiation on or within the substrate material.

In some embodiments, attachment of the cells to the substrate is enhanced by coating the substrate with compounds such as basement membrane components, agar, agarose, gelatin, gum arabic, collagens types I, II, II, IV, and V, fibronectin, laminin, glycosaminoglycans, mixtures thereof, and other hydrophilic and peptide attachment materials known to those skilled in the art of cell culture.

In some embodiments it may be desirable to add bioactive molecules to the cells. These are referred to generically herein as "factors" or "bioactive factors". Examples of growth factors include heparin binding growth factor (hbgf), transforming growth factor alpha or beta (TGF-β), alpha fibroblastic growth factor (FGF), epidermal growth factor (TGF), vascular endothelium growth factor (VEGF), some of which are also angiogenic factors. Other factors include hormones such as insulin, glucagon, and estrogen. In some embodiments it may be desirable to incorporate factors such as nerve growth factor (NGF) or muscle morphogenic factor (MMP).

Suitable growth conditions and media for cells in culture are well known in the art. Cell culture media typically comprise essential nutrients, but also optionally include additional elements (e.g., growth factors, salts and minerals) which may be customized for the growth and differentiation of particular cell types. For example, "standard cell growth media" include Dulbecco's Modified Eagles Medium, low glucose (DMEM), with 110 mg/L pyruvate and glutamine, supplemented with 10-20% Fetal Bovine Serum (FBS) or 10-20% calf serum (CS) and 100 U/ml penicillin. Other standard media include Basal Medium Eagle, Minimal Essential Media, McCoy's 5A Medium, and the like, preferably supplemented as above (commercially available from, e.g., JRH Biosciences, Lenexa, Kans.; GIBCO, BRL, Grand Island, N.Y.; Sigma Chemical Co., St. Louis, Mo.). By way of illustration, endothelial precursor cells (EPC) are one of the cell types that may be used to form an impact bearing surface of a vasculature model. EPCs can be expanded in vitro by any of the methods known in the art. For example, to expand EPCs in vitro, a leukocyte fraction containing EPCs is plated onto fibronectin-coated plates. See U.S. Patent Application 2004/0044403. It is desirable to perform a serial transfer of the cell suspension to new fibronectin-coated plates to remove rapidly adherent hematopoietic cells. After approximately 21 to 28 days in culture, the number of outgrowth colonies typically ranges between 2 to 3 per $1 \times 10^7$ total input cells. If allowed to continue growing, the outgrowth of cells expands exponentially and reached $1.6.\text{times}.10^9$ cells by 3 weeks. Additionally, EPC progenitors can be mobilized in vivo by administration of recruitment growth factors, e.g., GM-CSF and IL-3, prior to removing the progenitor cells from the patient.

Rapid Prototyping of Model Embodiments

According to other embodiments, subject invention adapts conventional rapid prototyping (RP) techniques to construct anatomical models according to embodiments of the subject invention. The subject invention utilizes materials not previously used in rapid protyping techniques, which allow quick production of tissue analog materials that mimic the properties of living tissues. The implementation of living tissue-like materials is key to giving medical practitioners the ability to accurately simulate a medical procedure. These materials may comprise hydrophilic monomers, mixtures of hydrophilic and hydrophobic monomers, monomer mixtures with or without thermal or photo initiators, monomer mixtures with or without dissolved polymers, or mixtures of monomers and polymers with or without chemical initiators. Hydrophilic monomers include but are not limited to 2-hydroxyethyl methacrylate, n-vinyl pyrrolidone, and vinyl acetate, hydrophobic monomers include but are not limited to methyl methacrylate and tetraethylene glycol dimethacrylate, polymers include but are not limited to polyvinyl alcohol and polyethylene oxide, and initiators include but are not limited to benzoyl peroxide and azobisisobutyronitrile. However, it should be understood that a great many other monomers, polymers, and initiators are commonly employed that also fall within the scope of the present invention.

A physical model made of tissue analog materials and derived from CT or MRI data can be held, felt, and manipulated, offering surgeons a direct, intuitive understanding of complex anatomical details which cannot be obtained from imaging on the screen. These physical models also allow the surgeon to practice a surgery (a surgical dry run) on a replica of the patient anatomy to help determine the best equipment and approach to use and help in predicting complications that might arise. This 'dry run' practice procedure increases the surgeon's confidence in the operation, and reduces the time that must be devoted during the actual surgery to the trial and error selection of surgical tools and procedures. This ultimately allows the surgeon, prior to the surgical procedure, to know what to expect when a certain surgical route is adopted. Thus it reduces the duration of the procedure and greatly reduces the risk of complications.

Complex and sensitive surgery requires extensive planning. In a surgery as delicate and complex as a coronary stent placement, for example, the best tool for approaching the target site can be more accurately evaluated. Surgical instruments identical to those used in the actual procedure can be employed on the models to determine the most conservative strategy. The model can be referred to during an operation for guidance during mock training procedures or for academic teaching of surgeons and young doctors.

According to one specific embodiment the subject invention is to directed a process of rapidly manufacturing an anatomical model comprising the steps of:
1) Create image of Anatomy of patient according to MRI, Fluoroscopy, or other imaging technique;
2) Convert image into a CAD model of the anatomy;
3) Convert the CAD model to a RP (rapid prototyping) format;
4) Slice the RP file into thin cross-sectional layers;
5) Construct the model one layer atop another; and
6) Clean and finish the model.

The steps in the above process are further described below:
1) Images of a anatomical structure are obtained by imaging techniques such as, computerized axial tomography (CAT scan), magnetic resonance imaging (MRI), medical ultrasound imaging (MUI) or related imaging technique known in the art and suited for such purpose.

2) Conversion to CAD Model: First, the model to be built is digitally constructed using a Computer-Aided Design (CAD) software package. Solid modelers, such as Pro/ENGINEER, tend to represent 3-D objects more accurately than wire-frame modelers such as AutoCAD, and will therefore yield better results. The designer can use a pre-existing CAD file or may wish to create one expressly for prototyping purposes. Some other commercially available CAD/Cam systems which can be used to provide custom-configured implants in accordance with this invention include Autocad and Pro/Engineer. Some software programs used to convert 3 d image files to CAD/Cam files are Velocity 2 by Image 3, LLC; TIM, by IVS-Software Engineering (Germany), Magic RP by Materialise; BioBuild, by Anatomics Pty. Ltd., etc.

3) Conversion to RP Format: The various CAD packages use a number of different algorithms to represent solid objects. To establish consistency, the RP format is typically put into a stereolithography (STL) format, since it has been adopted as the standard of the rapid prototyping industry. The second step, therefore, is to convert the CAD file into STL format. This format represents a three-dimensional surface as an assembly of planar triangles, "like the facets of a cut jewel." 6 The file contains the coordinates of the vertices and the direction of the outward normal of each triangle. Because STL files use planar elements, they cannot represent curved surfaces exactly. Increasing the number of triangles improves the approximation, but at the cost of bigger file size. Large, complicated files require more time to pre-process and build, so the designer must balance accuracy with manageability to produce a useful STL file. Since the stl format is universal, this process is identical for all of the RP build techniques.

4) Slice the STL File: In the third step, a pre-processing program prepares the STL file to be built. Several programs are available, and most allow the user to adjust the size, location and orientation of the model. Build orientation is important for several reasons. First, properties of rapid prototypes vary from one coordinate direction to another. For example, prototypes are usually weaker and less accurate in the z (vertical) direction than in the x-y plane. In addition, part orientation partially determines the amount of time required to build the model. Placing the shortest dimension in the z direction reduces the number of layers, thereby shortening build time. The pre-processing software slices the STL model into a number of layers from 0.01 mm to 0.7 mm thick, depending on the build technique. The program may also generate an auxiliary structure to support the model during the build. Supports are useful for delicate features such as overhangs, internal cavities, and thin-walled sections. Each PR machine manufacturer supplies their own proprietary preprocessing software.

5) Layer by Layer Construction: The fourth step is the actual construction of the artificial anatomical structure. Using one of several techniques (described in the next section) RP machines build one layer at a time from polymers and other materials. Most machines are fairly autonomous, needing little human intervention.

6) Clean and Finish: The final step is post-processing. This involves removing the prototype from the machine and detaching any supports. Some photosensitive materials need to be fully cured before use. Prototypes may also require soaking in a warm water or saline to remove residual monomer and to allow the part to achieve equilibrium water content.

Rapid Prototyping Techniques

Most commercially available rapid prototyping machines use one of six techniques: stereolithography, laminated object manufacturing, selective laser sintering, fused deposition modeling, solid ground curing, and 3-D ink-jet printing. The different rapid prototyping techniques have their unique strengths. Because RP technologies are being increasingly used in non-prototyping applications, the techniques are often collectively referred to as solid free-form fabrication, computer automated manufacturing, or layered manufacturing. The latter term is particularly descriptive of the manufacturing process used by all commercial techniques. A software package "slices" the CAD model into a number of thin (~0.1 mm) layers, which are then built up one atop another. Rapid prototyping is an "additive" process, conventionally combining layers of paper, wax, or plastic to create a solid object. In contrast, most machining processes (milling, drilling, grinding, etc.) are "subtractive" processes that remove material from a solid block. RP's additive nature allows it to create objects with complicated internal features that cannot be manufactured by other means. Below is a brief and general description of 6 rapid prototyping techniques. More description can be found at http://www.me.psu.edu/lamancusa/rapidpro/primer/chapter2.htm, and also described in U.S. Pat. Nos. 4,961,154, 5,198,159, 5,897,825, 6,508,971, and 6,790,403, the teachings of which are incorporated herein in their entirety to the extent not inconsistent with the teachings herein.

Stereolithography

The technique builds three-dimensional models from liquid photosensitive polymers that solidify when exposed to ultraviolet light. According to this technique, the model is conventionally built upon a platform situated just below the surface in a vat of liquid epoxy or acrylate resin. A low-power highly focused UV laser traces out the first layer, solidifying the model's cross section while leaving excess areas liquid. Next, an elevator incrementally lowers the platform into the liquid polymer. A sweeper re-coats the solidified layer with liquid, and the laser traces the second layer atop the first. This process is repeated until the prototype is complete. Afterwards, the solid part is removed from the vat and rinsed clean of excess liquid. Supports are broken off and the model is then placed in an ultraviolet oven for complete curing. As discussed below, stereolithography is the technique which is most easily adaptable to product of anatomical model embodiments as taught herein. These models could be constructed using standard stereolithography equipment by substituting hydrogel syrups for the materials normally employed in the resin bath. These hydrogel syrups would most likely be composed of a hydrophilic monomer such as, for example, n-vinyl pyrrolidone, a hydrophobic monomer such as, for example, methyl methacrylate, a polymer such as, for example, polyvinyl alcohol, a solvent such as, for example, water, and some type of chemical (thermally or photo activating) initiator.

Laminated Object Manufacturing

In this technique, layers of adhesive-coated sheet material are bonded together to form a prototype. The original material consists of paper laminated with heat-activated glue and rolled up on spools. A feeder/collector mechanism advances the sheet over the build platform, where a base has been constructed from paper and double-sided foam tape. Next, a heated roller applies pressure to bond the paper to the base. A focused laser cuts the outline of the first layer into the paper and then cross-hatches the excess area (the negative space in the prototype). Cross-hatching breaks up the extra material, making it easier to remove during post-processing. During the build, the excess material provides excellent support for overhangs and thin-walled sections. After the first layer is cut, the platform lowers out of the way and fresh material is advanced. The platform rises to slightly below the previous height, the roller bonds the second layer to the first, and the laser cuts the second layer. This process is repeated as needed to build the part, which will have a wood-like texture. Because the models are made of paper, they must be sealed and finished with paint or varnish to prevent moisture damage.

Selective Laser Sintering

The technique uses a laser beam to selectively fuse powdered materials, such as nylon, elastomer, and metal, into a solid object. Parts are built upon a platform which sits just below the surface in a bin of the heat-fusable powder. A laser traces the pattern of the first layer, sintering it together. The platform is lowered by the height of the next layer and powder is reapplied. This process continues until the part is complete. Excess powder in each layer helps to support the part during the build. SLS machines are produced by DTM of Austin, Tex.

Fused Deposition Modeling

In this technique, filaments of heated thermoplastic are extruded from a tip that moves in the x-y plane. Like a baker decorating a cake, the controlled extrusion head deposits very thin beads of material onto the build platform to form the first layer. The platform is maintained at a lower temperature, so that the thermoplastic quickly hardens. After the platform lowers, the extrusion head deposits a second layer upon the first. Supports are built along the way, fastened to the part either with a second, weaker material or with a perforated junction. Stratasys, of Eden Prairie, Minn. makes a variety of FDM machines ranging from fast concept modelers to slower, high-precision machines. Materials conventionally include ABS (standard and medical grade), elastomer (96 durometer), polycarbonate, polyphenolsulfone, and investment casting wax.

Solid Ground Curing

Solid ground curing (SGC) is somewhat similar to stereolithography (SLA) in that both use ultraviolet light to selectively harden photosensitive polymers. Unlike SLA, SGC cures an entire layer at a time. First, photosensitive resin is sprayed on the build platform. Next, the machine develops a photomask (like a stencil) of the layer to be built. This photomask is printed on a glass plate above the build platform using an electrostatic process similar to that found in photocopiers. The mask is then exposed to UV light, which only passes through the transparent portions of the mask to selectively harden the shape of the current layer. After the layer is cured, the machine vacuums up the excess liquid resin and sprays wax in its place to support the model during the build. The top surface is milled flat, and then the process repeats to build the next layer. When the part is complete, it must be de-waxed by immersing it in a solvent bath. SGC machines are distributed in the U.S. by Cubital America Inc. of Troy, Mich.

3-D Ink-Jet Printing

Ink-Jet Printing refers to an entire class of machines that employ ink-jet technology. The first was 3D Printing (3DP), developed at MIT and licensed to Soligen Corporation, Extrude Hone, and others. The ZCorp 3D printer, produced by Z Corporation of Burlington, Mass. (www.zcorp.coin) is an example of this technology. Parts are built upon a platform situated in a bin full of powder material. An ink-jet printing head selectively deposits or "prints" a binder fluid to fuse the powder together in the desired areas. Unbound powder remains to support the part. The platform is lowered, more powder added and leveled, and the process repeated. When finished, the green part is then removed from the unbound powder, and excess unbound powder is blown off. Finished parts can be infiltrated with wax, CA glue, or other sealants to improve durability and surface finish. Typical layer thicknesses are on the order of 0.1 mm.

3D Systems' (www.3dsystems.com) version of the ink-jet based system is called the Thermo-Jet or Multi-Jet Printer. It uses a linear array of print heads to rapidly produce thermoplastic models. If the part is narrow enough, the print head can deposit an entire layer in one pass. Otherwise, the head makes several passes.

DESCRIPTION OF THE ILLUSTRATIVE EMBODIMENTS

FIG. 1 shows one embodiment of the subject invention directed to a femoral artery model 100. The model 100 comprises artificial support tissue including muscle 122, skin 124, bone 126 and fat 128. Embedded into the artificial muscle 122 is a luminal structure 130 geometrically simulating a femoral artery. Portions of the luminal structure walls may be constructed of hydrogel, or preferably, as shown in FIG. 1 entire luminal structure wall is constructed of hydrogel material. The artificial support tissue may be constructed of hydrogel material, but not necessarily, and typically is made of other types of materials such as latex, rubber, silicone or combinations of the foregoing. The model 100 also comprises a seam 140 running along the longitudinal axis of the model 100. The model comprises two segments 145 and 142 which are brought together and engaged to one another by an appropriate mechanism. The segments 145 and 142 may be separated to access luminal structure 130 to remove for testing and/or to replace with another luminal structure for additional testing. For example, upon the luminal structure 130 being subjected to a predetermined test or simulated procedure while in the model 100, the luminal structure 130 may be removed to study the affect of such test or procedure on the luminal structure 130. Once the luminal structure 130 is removed from the model 100, it may be replaced by another to conduct a replicate test or procedure, or different test or procedure, without having to replace the entire model. Those skilled in the art will appreciate that the engageable segments 145 and 142 may be engaged by one or more of several different mechanisms including, but not limited to, snap/friction fit, magnetic coupling, hook and loop, adhesives, tongue and groove, zipper, and/or latching mechanism. In a specific embodiment shown in FIG. 1, the two segments 145 and 142 are hinged together via a latching mechanism 150 and hinges 155 such that they are separated by pivoting from each other. This hinged and latching mechanism allows for easy and reliable opening and securing of the separate sections 145 and 142 together. Furthermore, in most cases, the testing of the luminal structure 130 will involve the employment of a liquid to be directed through the luminal structure 130. Therefore, the model 100 may be equipped with a pump 160 fluidly communicative with lines 162, 164 and reservoir 166.

FIG. 2 shows a close-up perspective view of a luminal structure 200 that may be used as the luminal structure 130 in embodiment 100 described in FIG. 1. The luminal structure 200 represents a femoral artery model comprising three different layers: 210 simulating the tunica intima, 220 simulating the tunica media, and 230 simulating the tunica externa.

FIG. 3a shows a perspective view of a removable luminal structure embodiment 300 that comprises branches 310. FIG. 3b shows a perspective view of another luminal structure embodiment 330 not having branches. The luminal structures 300 or 330 may be used as the luminal structure in the femoral artery model shown in FIG. 1 and described above.

Further, for the various removable luminal structure embodiments described herein it is valuable that they comprise a means that allows the facile engagement to the model. FIG. 3c is a perspective view of a removable luminal structure 340 comprising at one end a magnetic coupling 342 that is engageable with a corresponding magnetic coupling 344 associated with a receiving portion 346 associated with the model (not shown). Preferably, the engagement of the removable luminal structure 340 to the receiving portion 346 is such that it liquid tight. As discussed herein, depending on the type of testing to be conducted, and the target tissue to be simulated, it is desirable to implement a liquid that is directed through the luminal structure 340. Those skilled in the art will appreciate that a magnetic coupling means is not the only means of engaging the removable luminal structure 340. Other means include, but are not limited to, snap fit, adhesive, friction fit, interference fit, or hook and loop fabric.

Figure 4:
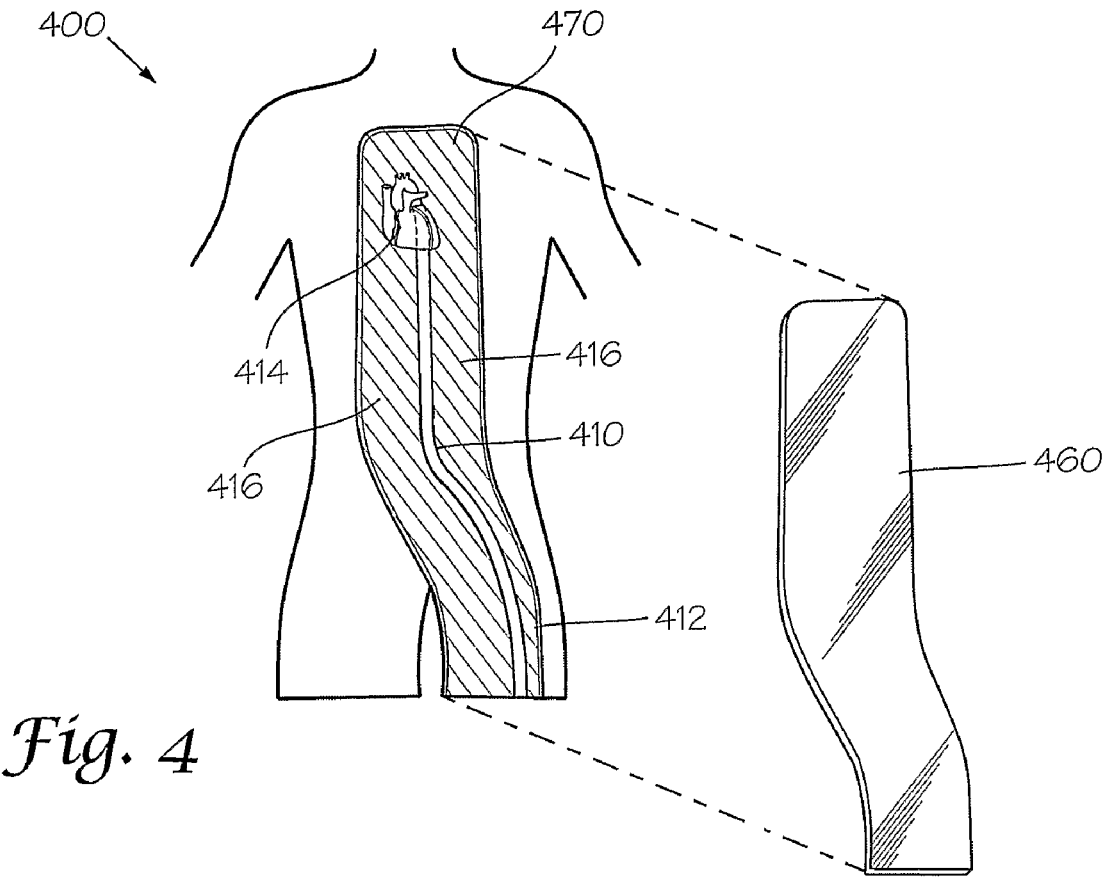
FIG. 4 shows a frontal view of one embodiment of the subject invention directed to a torso model.
Figure 5:
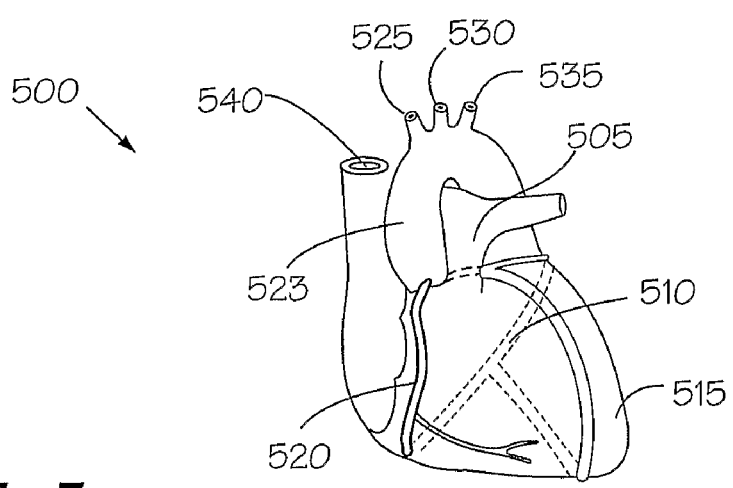
FIG. 5 shows a perspective view of one embodiment of the subject invention directed to a heart model.

FIG. 4 shows a partial breakaway view of another model 400 designed for testing medical devices intended to be directed to or implanted in a heart and approached through vasculature inferior the heart. The model 400 geometrically mimics a human torso with partial limb portions. The model 400 comprises a luminal structure 410 extending from one of the partial leg portions 412 to a simulated heart component 414. The luminal structure 410 has a femoral artery region, iliac artery region, abdominal aorta region, thoracic aorta region, descending aorta region, aortic arch region and ascending aorta region. The luminal structure 410 and supporting tissue region 416, i.e., tissue cooperative with and supporting the luminal structure 410 may be made of analog materials. Typically, the luminal structure 410 will be partially or wholly made of hydrogel. The luminal structure component 410 and heart component 414 may be readily dissociable from the supporting tissue 416. As described above for the femoral artery model, the model 400 may be comprised of two or more separatable segments so that they can be separated and access made to the luminal structure and/or heart to replace such components. As shown in FIG. 4, access to the luminal structure and/or heart is achieved by removing a door 460 defined on the model 400. The door 460 may be lifted off or pivoted open (such as by being hinged along one edge) such that access to the internal components in the internal chamber 470 is achieved. FIG. 5 shows a perspective view of a heart model embodiment 500 that may be implemented as the heart component 414 as described above for the heart model 400 shown in FIG. 4. The heart model embodiment 500 is therefore dissociable from the supporting tissue in and around the chamber 470 of the torso embodiment 400. The heart model embodiment 500 comprises luminal structures representing different coronary arteries: left coronary artery 505, circumflex artery 510, anterior interventricular artery 515, marginal artery, and right coronary artery 520. In addition, the heart embodiment comprises an aorta 523 with branches for the brachiocephalic 525, left common carotid 530, and left subclavian 535 arteries, as well as the superior vena cava 540. One or more of these luminal structures of the heart model embodiment 500 may be designed to be dissociable from the contiguous supporting tissue of the heart embodiment 500.

Figure 6:
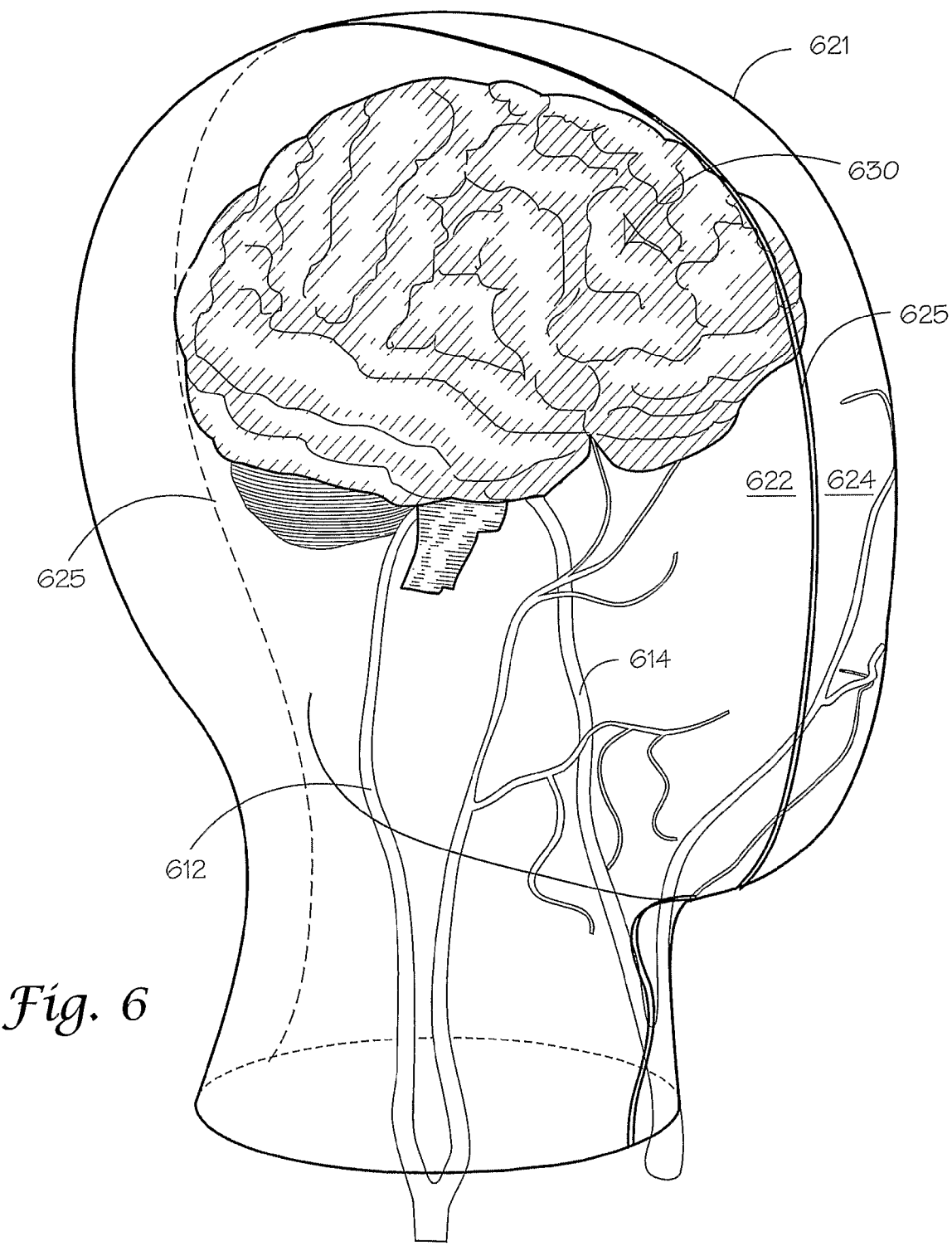
FIG. 6 shows a perspective view of one embodiment of the subject invention directed to a neurovasculature model.
Figure 8:
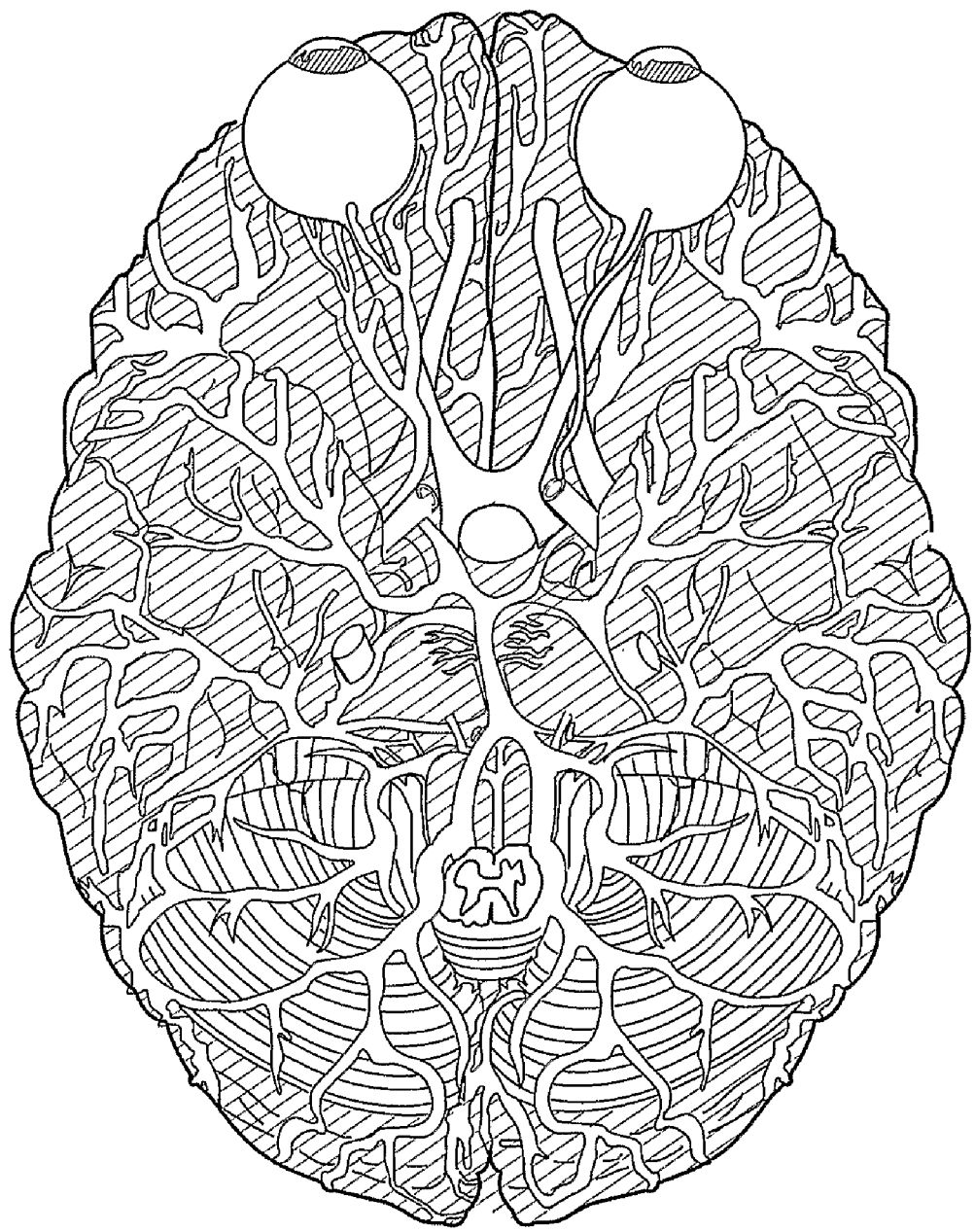
FIG. 8 is a rendering of a bottom view of a brain showing the level of detail of neurovasculature that may be implemented into a neurovasculature model.
Figure 10:
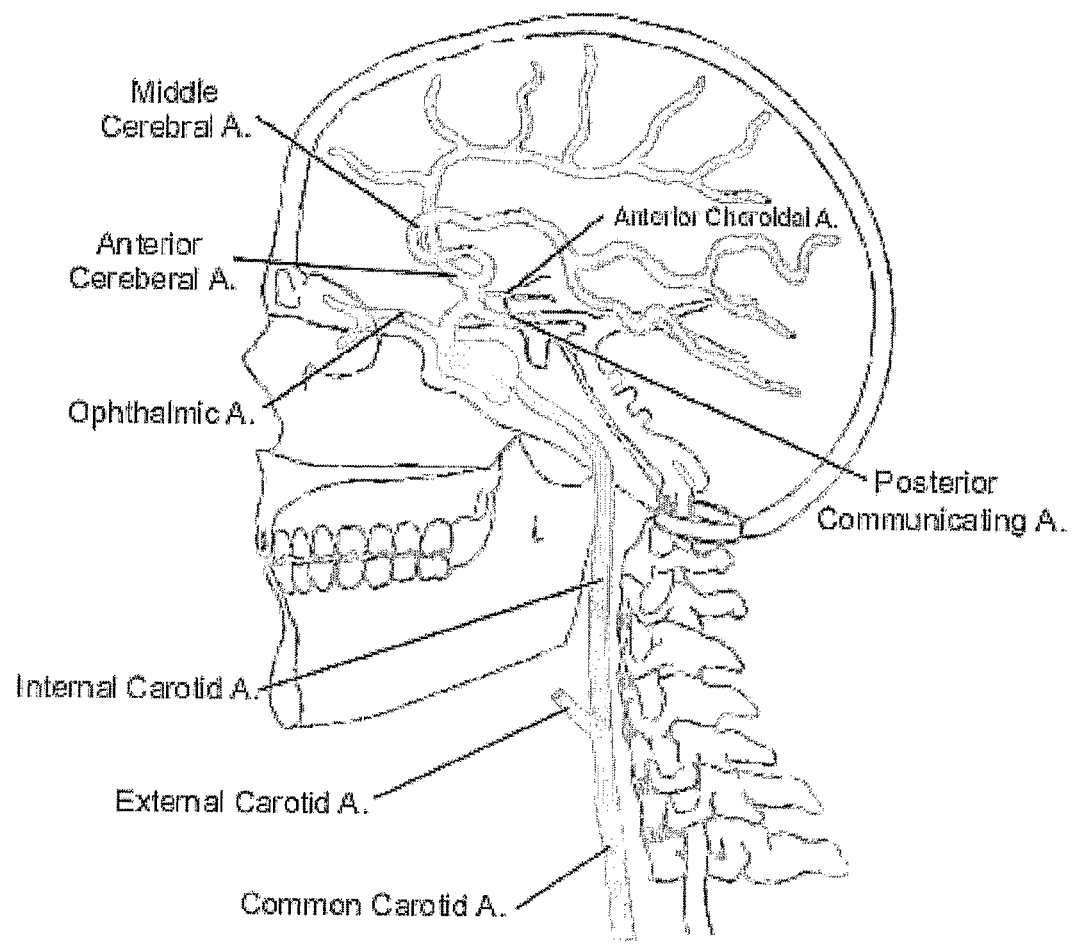
FIG. 10 is a cross-sectional view of a brain showing internal vasculature of the brain that may be simulated in a model embodiment of the subject invention.

FIG. 6 shows a transparent view of a neurovasculature model embodiment 600. The model is configured to geometrically mimic a human head and partial neck. The model 600 comprises a brain component 630 and multiple luminal structures geometrically mimicking and anatomically positioned to correlate to certain neurovasculature, such as right and left carotid arteries, 612, 614. The level of detail of the neurovasculature, as well inclusion of certain neurovasculature will depend on the particular needs and uses of the model 600. The model can be constructed to simulate neurovasculature surrounding the exterior of the brain as well as neurovasculature embedded within brain tissue. FIG. 8 is a bottom view of a brain showing, in detail, various neurovasculature associated with the brain. FIG. 10 is a cross-sectional view of a brain showing certain internal neurovasculature of the brain. The model 600 may be comprised of two or more removably engageable segments that are disengaged in order to access internal luminal structures and/or brain component 630, such as prior to or subsequent testing. As shown in FIG. 6, the model comprises a head support tissue casing 621 comprised of a right and left hemisphere segments 622, 624 respectively, as defined by seam 625. Segments 622 and 624 may be engaged together by a mechanism as described for embodiments 100 and 400.

Figure 11:
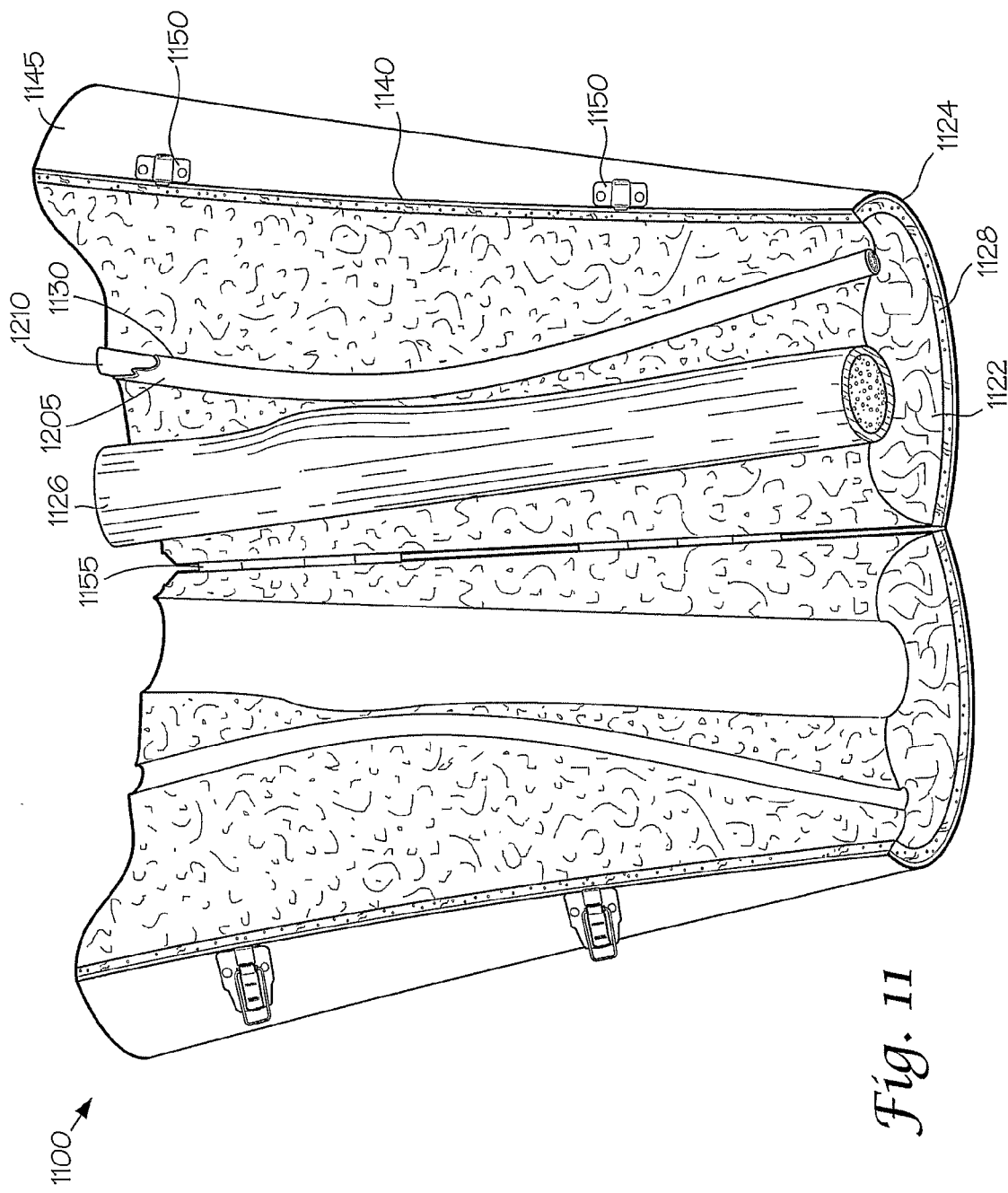
FIG. 11 shows a perspective view of a femoral artery model embodiment comprising an artery lined with living cells and nourishment delivery channels

FIG. 11 shows one embodiment of the subject invention directed to a femoral artery model 1100. The model 1100 comprises artificial support tissue including muscle 1122, skin 1124, bone 1126 and fat 1128. Embedded into the artificial muscle 1122 is a luminal structure 1130 geometrically simulating a femoral artery. Portions of the luminal structure walls may be constructed of hydrogel, or preferably, as shown in FIG. 11 entire luminal structure wall is constructed of hydrogel material and composite materials incorporating hydrogel materials. The artificial support tissue may also be constructed of hydrogel material, but not necessarily. The model 1100 also comprises a seam 1140 running along the longitudinal axis of the model 1100. The model comprises two segments 1145 and 1142 which are brought together and engaged to one another by an appropriate mechanism. The segments 1145 and 1142 may be separated to access luminal structure 1130 to remove for testing and/or to replace with another luminal structure for additional testing. For example, upon the luminal structure 1130 being subjected to a predetermined test or simulated procedure while in the model 1100, the luminal structure 1130 may be removed to study the affect of such test or procedure on the luminal structure 1130. Once the luminal structure 1130 is removed from the model 100, it may be replaced by another to conduct a replicate test or procedure, or different test or procedure, without having to replace the entire model. Those skilled in the art will appreciate that the engageable segments 1145 and 1142 may be engaged by one or more of several different mechanisms including, but not limited to, snap/friction fit, magnetic coupling, hook and loop, adhesives, tongue and groove, zipper, and/or latching mechanism. In a specific embodiment shown in FIG. 11, the two segments 1145 and 1142 are hinged together via a latching mechanism 1150 and hinges 1155 such that they are separated by pivoting from each other. This hinged and latching mechanism allows for easy and reliable opening and securing of the separate sections 1145 and 1142 together. Furthermore, in most cases, the testing of the luminal structure 1130 will involve the employment of a liquid to be directed through the luminal structure 1130. Therefore, the model 1100 may be equipped with a pump 1160 fluidly communicative with lines 1162, 1164 and reservoir 1166. The artery 1130 may comprise living cells lining a portion thereof and include a sleeve with channels as will be discussed below in relation to FIG. 12.

FIG. 12 shows a luminal structure model 1200 comprising living cells 1215 lining a luminal wall 1220 of a luminal substrate 1210. FIG. 13 shows a cross-sectional view of the plane 13-13. Of particular interest is a luminal substrate 1210 that is comprised of a material through which nourishing molecules can pass to provide nourishment to the cells 1215 lining the luminal wall 1220. This is particularly helpful in growing the cells on the luminal wall 1220 as well as maintaining the cells, as nourishment media can be applied to the outer surface 1217 of the luminal substrate 1210 which then passes through the substrate 1210 and nourishes the cells 1215. In other embodiments, depending on the nature of the tests being performed on the model, nourishing media can be applied directly to the cells by passing the media in fluid form through the lumen defined by the luminal substrate 1210. FIG. 12 shows a cover 1205 that is disposed around the luminal substrate 1210. The cover 1205 comprises channels 1225 defined on an inner wall 1227 of the cover 1205. The cover may be comprised of any suitable analog material, but will typically be composed of a hydrogel or a composite material incorporating a hydrogel. The juxtaposition of the inner wall surface 1227 of the cover 1205 against the luminal substrate 1210 creates nourishment delivery conduits formed by the channels 1225 and the outer surface 1217 of the luminal substrate. Those skilled in the art, in view of the teachings herein, will readily appreciate numerous other approaches to supplying nourishment media to the luminal substrate so as to provide nourishment to the cells 1215. On the end of the luminal structure 1200 is a seal 1245 which will be discussed in the description of FIG. 14 below.

FIG. 14 shows a cross sectional view of the embodiment 1200 along plane 14-14 as shown in FIG. 12. The portion of embodiment 1200 shown in FIG. 14 shows the end of the luminal structure 1200 that comprises a seal 1245 that enables the delivery of nourishing media to the channels 1225 and ultimately to cells 1215 along the luminal wall surface 1220. The seal 1245 comprises an arcuate shape that surrounds the end of the cover 1205, wherein a outer flap 1272 abuts against the outer wall 1270 of the cover 1205 and an inner flap 1274 that abuts against the inner wall 1227 of the cover 1205. The seal 1245 comprises a chamber 1275 into which nourishing media is delivered and a nozzle 1277 for injection of the nourishing media into the chamber 1275. Nourishing media then travels from the chamber 1275 down the channels 1225 for delivery of nutrients to the cells 1215.

Figure 15:
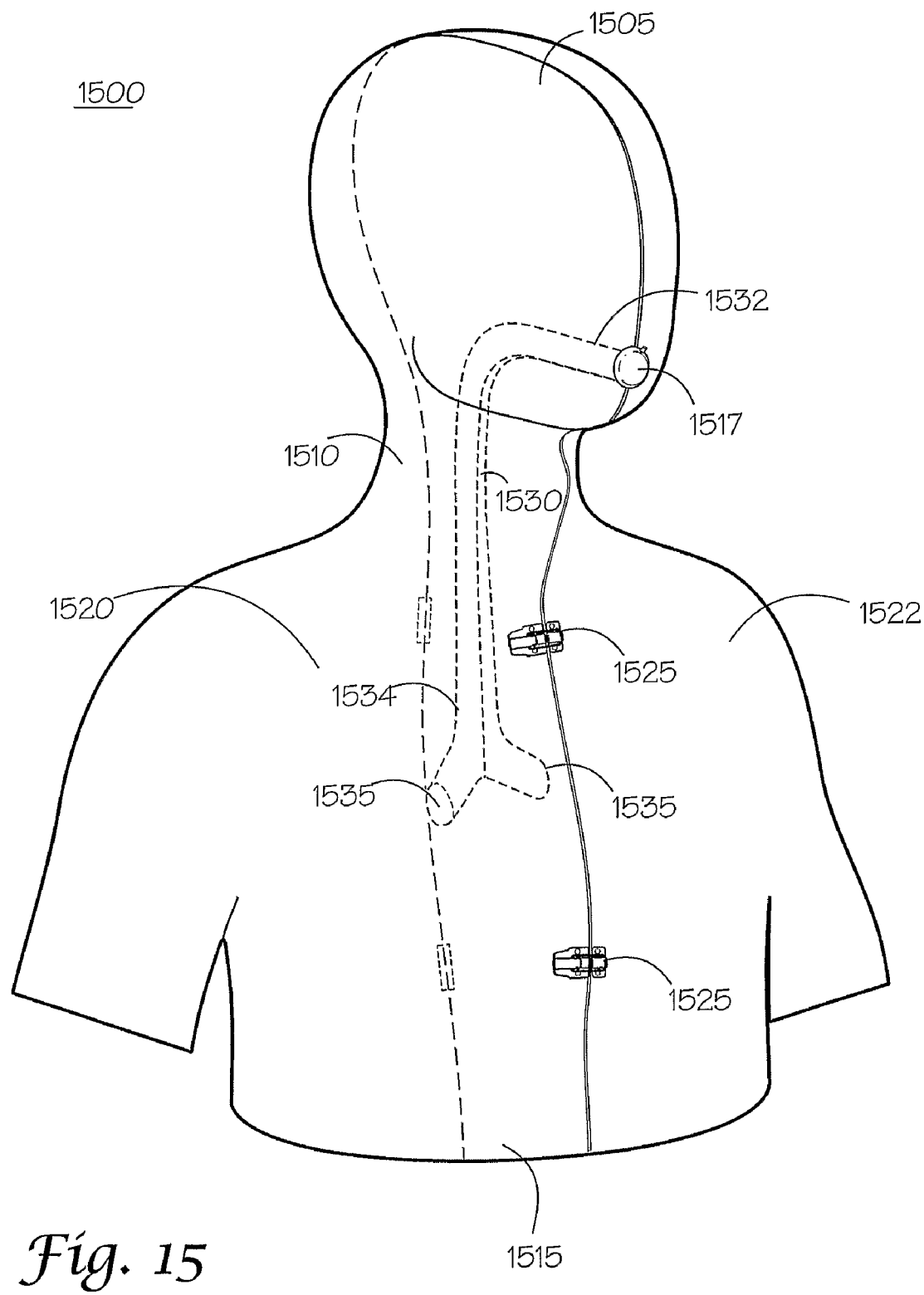
FIG. 15 shows a perspective view of a trachea embodiment.

Turning to FIG. 15, a perspective view of a trachea model 1500 is shown. The model comprises a head 1505, neck 1510 and torso 1515 that is divided into right 1520 and left 1522 portions. The right and left portions are fastened together with fasteners 1525. The right and left portions 1520, 1522 may be separated to expose a luminal structure secured therein that is configured to geometrically mimic a trachea 1530. The trachea structure 1530 comprises a first end 1532 which opens out of an orifice 1517 in the head 1505. On its second end 1534, the trachea structure 1530 divides into two branches 1535 representing bronchi. Of particular interest is a trachea structure that comprises living cells (not shown) seeded on a luminal wall (not shown) thereof, similar to that discussed above for FIG. 12. Medical devices such as endotracheal tubes may be inserted into the tracheal structure 1530 to study their affect on the cells seeded on luminal surface of the trachea structure 1530.

The Femoral Puck is a model of the human tissues that reside in the inner groin area, particularly the femoral artery and surrounding tissues near the head of the femoral bone. This portion of the anatomy is frequently accessed by medical devices that are inserted into the femoral artery in transit to the peripheral, coronary, and cranial vasculature. Referring to FIG. 18, the Femoral Puck mimics the tissues in this area between the skin surface (FIG. 18a, top side) and the femoral artery (FIG. 18b, bottom side), and allows developers to perform simple tests involving devices (such as femoral puncture closure devices) that target these tissues. FIG. 16 shows a cross section view of a specific femoral puck embodiment 1600. The femoral puck comprises a plurality of discs of tissue analog materials 1601, 1602, 1603 and 1604. The different discs may have varying properties to simulate different tissue layers. The top most layer 1601 is formulated to most simulate the properties of skin and attached tissues. The bottom most layer 1604 is formulated to simulate various vascular tissues. The middle layers 1602 and 1603 are formulated to mimic muscle, fat, fascia, and other embedded tissues. The discs 1601-1604 are secured together via adhesive 1606, suture, or other chemical or mechanical means disposed at the periphery and through implementation of a seal 1608 around the edges of the discs 1601-1604.

FIG. 17a shows a longitudinal cross-sectional view of another embodiment of a luminal structure 1700 that comprises an outer layer 1701 and inner layer 1703 that are spaced apart to define a conduit 1709 for supplying nutrients to cells (not shown) disposed in luminal wall of the lumen 1705 defined by the inner layer 1703. This conduit 1709 is a continuous chamber surrounding the outer surface of the inner layer 1703. The outer layer and inner layer are attached to each other by adhesive 1707 which seals off the conduit 1709. Those skilled in the art will understand that there are numerous configurations for defining the conduit and sealing the conduit. Nourishing media is injected into the conduit 1709 through a port 1710. Those skilled in the art will appreciate that there are numerous configurations for accessing the conduit 1709 for delivery of nourishing media, including, but not limited to, injection through a syringe needle. FIG. 17b. represents a cross-sectional view along the 7-7 axis shown in FIG. 17a.

Example 1

Testing of a Guidewire Exchange Catheter

This following experiment describes a simple Animal Replacement Model used in the testing of a guidewire exchange catheter. The testing described includes the simulation of worst-case conditions to provide an estimate of device performance and reliability when misused in a clinical setting. This data was used to determine the suitability of the device for clinical trials. The materials required appear in Table III and the fabrication process for the tissue analog materials appears in Table IV.

TABLE III

Materials and devices used in simulation example.

| Device or Material Used | Quantity | Device Code |
|---|---|---|
| Balloon Guidewire | 13 | 1 |
| Guidewire Exchange Catheter | 13 | 2 |
| AVE GT1 Floppy Guidewire | 1 | 3 |
| AVE Microstent II Stent Catheter | 1 | 4 |
| ACS RX Multilink Stent Catheter | 1 | 5 |
| Scimed Niron Ranger Stent Catheter | 1 | 6 |
| Scimed Magic Wallstent Stent Catheter | 1 | 7 |
| Hotplate Stirrer | 1 | — |
| Animal Replacement Model | 1 | — |
| Dimethyl Sulfoxide | A/R | — |
| Polyvinyl Alcohol ($M_w$ = 130k-150k) | A/R | Completely hydrolysed |

TABLE IV

Fabrication process tabulation for poly(vinyl alcohol) hydrogel tissue analogs. PVA (99% minimum degree of hydrolysis, 100,000 minimum $M_w$) and DMSO (dimethyl sulfoxide) are used as received. Water is distilled or purified prior to use. The resulting syrup may be cast immediately or stored indefinitely at room temperature.

| Step | Directions |
|---|---|
| 1 | Clean a 1.5 inch diameter glass or plastic mold (culture plate) with ethanol and place on a level surface. |
| 2 | Determine the quantities of reagent required. An 8% PVA solution will be prepared in a 1:1 mixed solvent. 100 grams of solution will require 8 grams of PVA, 46 grams of DMSO, and 46 grams of water. |
| 3 | Create the mixed solvent by adding equal portions of water and DMSO to a round bottom flask. Set the flask on a stirring hotplate and equilibrate to 85° C. |
| 4 | Add the PVA polymer to the flask while stirring. Solution is encouraged if the polymer is added slowly. Continue stirring until dissolution is complete. |
| 5 | After solution is achieved loosely cap the flask, reduce the temperature to 75° C., and continue stirring for a period of 6 hours. After this time the solution may be stored at room temperature for later use or reheated to 85° C. for casting. |
| 6 | Pour 7 ml of the solution into the mold and allow the casting to gel over a 24 hour period. After this time the casting may be removed and placed in a warm water bath to extract the DMSO. Once the solvent is completely removed fabrication is complete. |

Test Directions (1) Ensure that all DMSO has been removed from the PVA disc prior to use. Extraction in clean water for at least 24 hours is required to guarantee the purity of the disc.

(2) Cut a 2 inch square section off of a lint-free wipe. Wet the center of the section with a few drops of water (don't wet the edges), then tape the section to a flat surface one edge at a time. Ensure that the wipe is flat before taping down the last edge.

(3) Set up the Animal Replacement Model as shown in FIGS. 7A&B. Insert a 9F guide into the glass tube so that the tip extends 2 mm beyond the end of the tube. FIGS. 7A&B show the PVA disc secured to lab benchtop.

(4) Adjust the rotational position knob on the stand so that the angle of attack is approximately 80-85 degrees. The angle of attack is measured between the normal vector of the PVA disc surface plane and the primary axis of the glass tube.

(5) Insert a 9F guide catheter through the glass tube so that approximately 2 mm extends beyond the end of the glass tube.

(6) Place a PVA disc on the center of the lint-free wipe and position the Animal Replacement Model so that the tip of the guide catheter is centered over the disc.

(7) See FIG. 7B Adjust the vertical position knob on the fixture so that the tip of the guide catheter is approximately 1-2 mm from the surface of the disc.

(8) Fill a syringe (20 cc is greater capacity) with water and attach to the Y-branch on the guide. Close the Hemostasis valve and flood the guide so that the excess water is ejected onto the PVA disc. The disc needs to remain completely hydrated during the experiment, so each time a disc is replaced the guide must be flushed again.

(9) Each one of the devices listed in Table III will be placed through the guide so that it impacts the surface of the PVA disc. No more than 8 inches of each device will be passed out of the distal end of the guide and only one pass will be performed.

(10) After completion of all testing each PVA disc will be graded subjectively following the scorecard described in Table V. Blot water off of the disc prior to inspection so that the surface may be better visualized.

(11) Inspect each disc and record results in Table VI. Scores midway between those described in the table are permissible.

TABLE V

Scoring formula for visual damage to Animal Replacement Model disc.

| Grade | Comments |
|---|---|
| 0 | No visible damage |
| 1 | Visible mark on surface |
| 2 | Compression marks or skipping grooves |
| 3 | Deep compression or grooving |
| 4 | Tissue model perforation or tear |

TABLE VI

Individual device scores for Animal Replacement Model test.

| Code | Score |
|---|---|
| 1-1 | 1.0 |
| 1-2 | 0.5 |
| 1-3 | 0.0 |
| 1-4 | 0.5 |
| 1-5 | 1.0 |
| 1-6 | 0.0 |

TABLE VI-continued

Individual device scores for Animal Replacement Model test.

| Code | Score |
|---|---|
| 1-7 | 1.0 |
| 1-8 | 0.5 |
| 1-9 | 1.0 |
| 1-10 | 0.0 |
| 1-11 | 0.5 |
| 1-12 | 0.0 |
| 1-13 | 0.5 |
| 2-1 | 1.0 |
| 2-2 | 1.0 |
| 2-3 | 2.0 |
| 2-4 | 1.5 |
| 2-5 | 1.5 |
| 2-6 | 1.5 |
| 2-7 | 1.0 |
| 2-8 | 0.5 |
| 2-9 | 2.0 |
| 2-10 | 1.0 |
| 2-11 | 2.5 |
| 2-12 | 1.0 |
| 2-13 | 1.5 |
| 3 | 0.5 |
| 4 | 2.5 |
| 5 | 1.0 |
| 6 | 1.5 |
| 7 | 1.0 |

TABLE VII

Summary of device scores for Animal Replacement Model test.

| Code | Device | Mean | Std Dev |
|---|---|---|---|
| 1 | Balloon Guidewire | 0.43 | 0.44 |
| 2 | Guidewire Exchange Catheter | 1.38 | 0.54 |
| 3 | AVE GT1 Floppy Guidewire | 0.5 | — |
| 4 | AVE Microstent II Stent Catheter | 2.5 | — |
| 5 | ACS RX Multilink Stent Catheter | 1.0 | — |
| 6 | Scimed Niron Ranger Stent Catheter | 1.5 | — |
| 7 | Scimed Magic Wallstent Stent Catheter | 1.0 | — |

Discussion of Results

The test plan included 13 Balloon Guidewires, 13 Guidewire Exchange Catheters, 1 standard coronary guidewire, and 4 stent catheters. The stent catheters and coronary guidewire are available commercially in the U.S., while the Balloon Guidewire has been approved for clinical trials in Europe. The Guidewire Exchange Catheter is the focus of this experiment.

The test results described in Tables VI and VII were derived from 7 different devices tested under otherwise identical conditions. In each instance the same test fixture, with identical attack angle and tip gap, was employed. The tissue analogs (PVA discs) were fabricated in a single batch and were identical. All testing was performed in a single session by one operator. It is reasonable, therefore to attribute performance differences between individual device tests to the devices themselves.

The impact of each device on the tissue analog is illustrated in FIG. 9A-C. The guidewire (FIG. 9A) had minimal effect, leaving an impression (surface remained unbroken) approximately 0.15 mm in width. The AVE Microstent II stent catheter (FIG. 9B) penetrated the surface and left a much wider 0.70 mm groove in the tissue model. The Guidewire Exchange Catheter (FIG. 9C) skipped along the surface of the model and created impressions that were as wide as 0.75 mm in some places. Referring to Table VII it may be seen that the mean damage score (n=13) for the Balloon Guidewire was less than 0.5, which corresponds to the creation of very minor, transient impressions in the model. The score range was 0.0-1.0.

The mean score attributed to the Guidewire Exchange Catheter was less than 1.5, which corresponds to visible impressions, which may or may not result from penetration of the surface. Closer inspection of the individual data points reveals that the surface was actually compromised (range was 0.5-2.5) in less than a third of the specimens.

The scores attributed to the various stent catheters range between 1.0 and 2.5, with a median value of 2.0. In fact, the worst damage caused by the stent catheter group was the 2.5 score attributed to the AVE Microstent II, which was equaled in only one instance by the Guidwire Exchange Catheter in 13 repetitions.

The scores achieved by the Guidewire Exchange Catheter were lower than the median stent catheter value in 10 of the 13 trials. This data supports the argument that the use of the Guidewire Exchange Catheter is no more likely to cause injury in actual clinical use than other devices commercially available in the U.S.

Example 2

Rapid production of Neurovascular Model Employing a Monomer Containing Tissue Analog Liquid According to one specific embodiment, the subject invention relates to the production of an anatomical neurovascular brain model comprising hydrogel materials and constructed using modified stereolithic techniques. Upon obtaining the anatomical images, converting them to CAD format and then converting to STL format, the model is built upon a platform situated just below the surface in a vat of tissue analog liquid. The liquid comprises water (50%-90% by mass), a monomer (10%-50% by mass), and an initiator (0.1%-1.0% by mass). In this example, a monomer such as N-vinyl pyrrolidone is implemented and a UV initiator such as ethyl 2,4,6-trimethylbenzoylphenylphosphinate is utilized. In this embodiment, the equilibrium water content of the tissue analog liquid closely approximates that of the intended hydrogel material of the artificial anatomical structure. Preferably, the water content of the tissue analog liquid is no more than 20 percent lower or higher than the equilibrium water content of the artificial anatomical structure.

A low-power highly focused UV laser traces out the first layer, solidifying the model's cross section while leaving excess liquid. The elevator incrementally lowers the platform into the tissue analog liquid. A sweeper re-coats the solidified layer with tissue analog liquid, and the laser traces the second layer atop the first. This process is repeated until the prototype is complete. Afterwards, the constructed model structure is removed from the vat and rinsed clean of excess liquid. Supports are removed and the model structure may be placed in an ultraviolet oven for further curing. The part will then be soaked in warm water or saline to remove residual monomer and to allow the part to reach equilibrium water content.

A high level of detail in geometrically mimicking the architecture of the vasculature of a patient's brain is achieved. It is contemplated that properties of vasculature will be different from supporting tissue around the vasculature. The properties of a particular location can be modified by regulating the duration of the light source. For example, the formation of the vasculature lumen structure could be made more pliable and resilient than the supporting brain tissue.

Example 3

Rapid Production of Neurovascular Model Employing a Polymer Containing Tissue Analog Liquid According to this example, an artificial anatomical model is constructed utilizing modified stereolithography techniques that employ a tissue analog liquid comprising water, a polymer, and a cross-linking agent. The polymer agent in this example is poly-vinyl alcohol and the cross-linking agent is glutaraldehyde. The basic methodology is similar to that described in Example 1, except that instead of the tissue analog liquid comprising a monomer that forms a polymer network, the tissue analog liquid comprises a polymer that is cross-linked to achieve the desired gelling and other properties of the tissue analog material.

Example 4

Rapid Production of Neurovascular Model Employing a Monomer/Polymer Containing Tissue Analog Liquid According to this example, an artificial anatomical model is constructed utilizing modified stereolithography techniques that employ a tissue analog liquid comprising water, a polymer, a monomer, and an initiator. The polymer agent in this example is poly-vinyl alcohol, monomer is n-vinyl pyrrolidone and the initiator is ethyl 2,4,6-trimethylbenzoylphenylphosphinate. The basic methodology is similar to that described in Example 1, except that instead of the tissue analog liquid comprising a monomer that forms a polymer network, the tissue analog liquid comprises a polymer and monomer mix, wherein the monomer polymerizes to achieve the desired gelling and other properties of the tissue analog material.

Example 5

Rapid Production of an Anatomical Model Employing a Non-Water or Low-Water Tissue Analog Liquid or Powder According to this example, an artificial anatomical model is constructed utilizing a tissue analog liquid or powder comprising tissue analog material components, but which does not contain water, contains very low levels of water. In the first stage of production of the anatomical models, the model is made similar to that described in Examples 2, 3, and 4, except that it does not simulate properties of tissues, it is made as a hardened model. Once the model is made, it undergoes a second stage. The model is then subjected to a water containing liquid wherein the model takes in the water, and therefore expands into the desired geometrical shape and size. Once water is absorbed into the tissue analog material, the model develops the desired tissue properties. In producing models according to this example, the engineer will need to predict the ability of the model to absorb the water and formulate the non-water or low-water tissue analog liquid or powder accordingly. The engineer will need to be mindful that damage to the gel network can occur as the hardened model absorbs water and stretches into shape.

Example 6

Network System for Rapid Production of Artificial Models Geometrically Mimicking Human Anatomical Structures This example is directed to system designed for the rapid preparation of artificial anatomical models employing data from a patient. The data may take the form of radiological data, such as data resulting from magnetic resonance imaging ("MRI"), computer tomography ("CT"), and/or X-ray. The data is typically acquired at a first site, while engineering and/or manufacturing services and equipment are located at a second site, remote with respect to the first site.

Transmittal of a patient's data over telecommunication or computer networks can significantly reduce the time required for artificial anatomical model preparation, enhance the surgical planning process, as well as allow the custom manufacturing of the artificial anatomical model. This may greatly increase the responsiveness of the medical practice, with attendant benefits to patient treatment, especially in emergency treatment. It also reduces geographical restrictions on the availability of this medical technology, and can allow the centralization or pooling of resources, such as engineering talent and machine tools.

Figure 19:
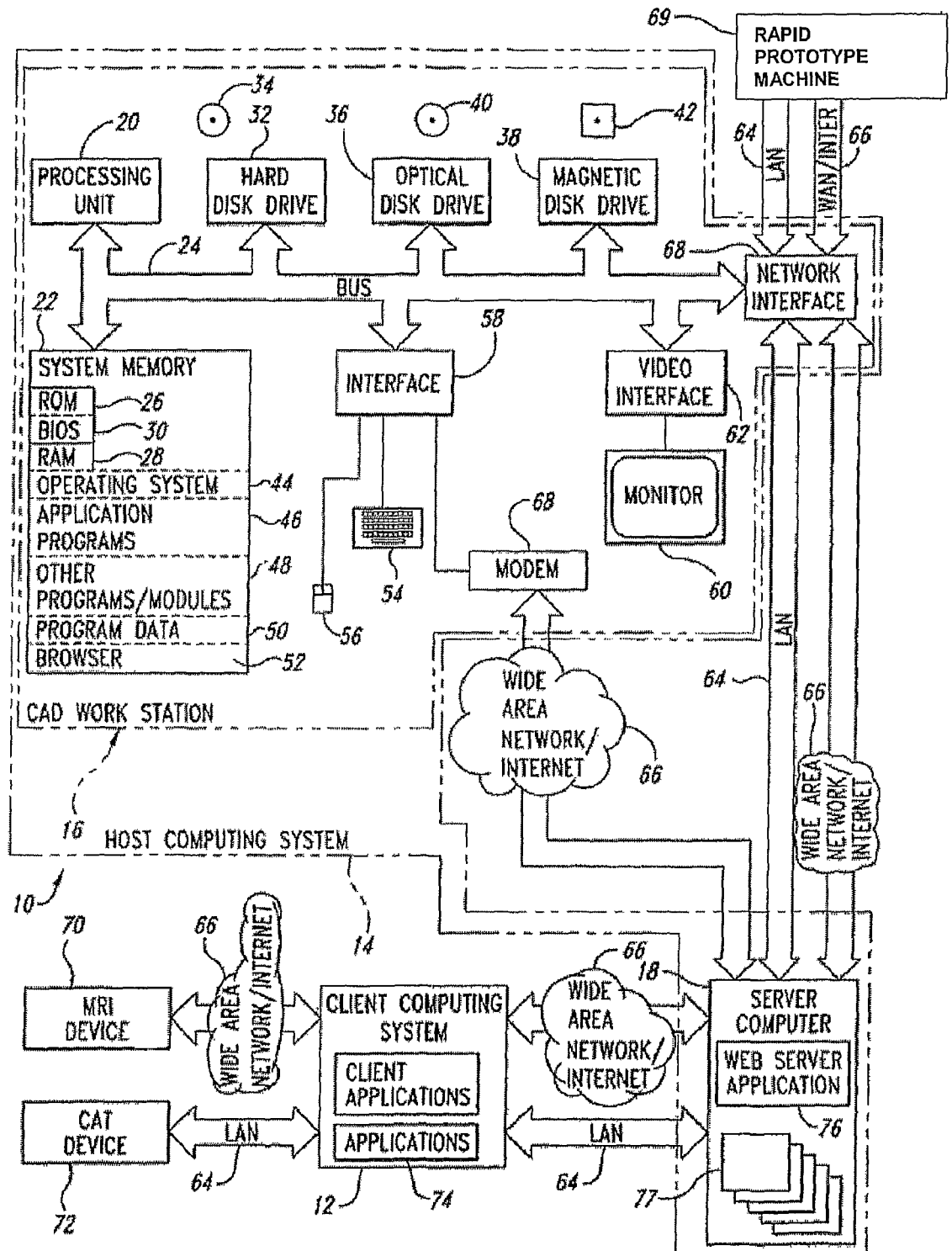
FIG. 19 shows a diagram of a system embodiment.

FIG. 19 and the following discussion provide a brief, general description of a suitable computing environment in which embodiments of the invention can be implemented. Although not required, embodiments of the invention will be described in the general context of computer-executable instructions, such as program application modules, objects, or macros being executed by a computer. Those skilled in the relevant art will appreciate that the invention can be practiced with other computer system configurations, including handheld devices, multiprocessor systems, microprocessor-based or programmable consumer electronics, personal computers ("PCs"), network PCs, mini computers, mainframe computers, and the like. The invention can be practiced in distributed computing environments where tasks or modules are performed by remote processing devices, which are linked through a communications network. In a distributed computing environment, program modules may be located in both local and remote memory storage devices.

Referring to FIG. 19, a rapid anatomical model design and manufacturing system includes a client computing system 12 and a host computing system 14. The client computing system 12 may be located at a diagnostic site, such as a hospital, clinic, laboratory or doctor's office. The host computing system 14 may be located at a site remote from the diagnostic site, such as at a site of an anatomical model designer or manufacturer.

The host computing system 14 includes a conventional mainframe or minicomputer, referred to herein as the computer aided design ("CAD") workstation 16 and a server computer 18. While shown as separate devices, the server functionality can be implemented within the CAD workstation 16, which may reduce the cost of the system 10, but may also cause an unacceptable degradation in system performance.

The CAD workstation 16 includes a processing unit 20, a system memory 22 and a system bus 24 that couples various system components including the system memory 22 to the processing unit 20. The CAD workstation 16 and/or server computer 18, will at times be referred to in the singular herein, but this is not intended to limit the application of the invention to a single CAD workstation 16 and/or server computer 18 since in typical embodiments, there will be more than one CAD workstation 16 and/or server computer 18.

The anatomical model design and manufacturing system 10 may employ other computers, such as conventional personal computers, where the size or scale of the system allows. The processing unit 20 may be any logic processing unit, such as one or more central processing units (CPUs), digital signal processors (DSPs), application-specific integrated circuits (ASICs), etc. Unless described otherwise, the construction and operation of the various blocks shown in FIG. 1 are of conventional design. As a result, such blocks need not be described in further detail herein, as they will be understood by those skilled in the relevant art.

The system bus 24 can employ any known bus structures or architectures, including a memory bus with memory controller, a peripheral bus, and a local bus. The system memory 22 includes read-only memory ("ROM") 26 and random access memory ("RAM") 28. A basic input/output system ("BIOS") 30, which can form part of the ROM 26, contains basic routines that help transfer information between elements within the CAD workstation 16, such as during start-up.

The CAD workstation 16 also includes a hard disk drive 32 for reading from and writing to a hard disk 34, and an optical disk drive 36 and a magnetic disk drive 38 for reading from and writing to removable optical disks 40 and magnetic disks 42, respectively. The optical disk 40 can be a CD-ROM, while the magnetic disk 42 can be a magnetic floppy disk or diskette. The hard disk drive 34, optical disk drive 40 and magnetic disk drive 42 communicate with the processing unit 20 via the bus 24. The hard disk drive 32, optical disk drive 36 and magnetic disk drive 38 may include interfaces or controllers (not shown) coupled between such drives and the bus 24, as is known by those skilled in the relevant art. The drives 32, 36 and 38, and their associated computer-readable media 34, 40, 42, provide nonvolatile storage of computer readable instructions, data structures, program modules and other data for the CAD workstation 16. Although the depicted CAD workstation 16 employs hard disk 34, optical disk 40 and magnetic disk 42, those skilled in the relevant art will appreciate that other types of computer-readable media that can store data accessible by a computer may be employed, such as magnetic cassettes, flash memory cards, digital video disks ("DVD"), Bernoulli cartridges, RAMs, ROMs, smart cards, etc.

Program modules can be stored in the system memory 22, such as an operating system 44, one or more application programs 46, other programs or modules 48 and program data 50. The system memory 16 may also include a Web client or browser 52 for permitting the CAD workstation 16 to access and exchange data with sources such as Web sites of the Internet, corporate intranets, or other networks as described below, as well as other server applications on server computers including the server computer 18, such as those further discussed below. The browser 52 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of Web clients or browsers are commercially available such as NETSCAPE NAVIGATOR from America Online, and INTERNET EXPLORER available from Microsoft of Redmond, Wash.

While shown in FIG. 19 as being stored in the system memory 22, the operating system 44, application programs 46, other programs/modules 48, program data 50 and browser 52 can be stored on the hard disk 34 of the hard disk drive 32, the optical disk 40 of the optical disk drive 36, the magnetic disk 42 of the magnetic disk drive 38 and/or other computer-readable media. An operator, such as a mechanical engineer or technician, can enter commands and information into the CAD workstation 16 through input devices such as a keyboard 54 and a pointing device such as a mouse 56. Other input devices can include a microphone, joystick, game pad, scanner, etc. These and other input devices are connected to the processing unit 20 through an interface 58 such as a serial port interface that couples to the bus 24, although other interfaces such as a parallel port, a game port or a wireless interface or a universal serial bus ("USB") can be used. A monitor 60 or other display device is coupled to the bus 24 via a video interface 62, such as a video adapter. The CAD workstation 16 can include other output devices, such as speakers, printers, etc.

The CAD workstation 16 can operate in a networked environment using logical connections to one or more remote computers, such as the server computer 18 and client computing system 12. The server computer 18 can be another personal computer, a server, another type of computer, or a collection of more than one computer communicatively linked together and typically includes many or all of the elements described above for the CAD workstation 16. The server computer 18 is logically connected to one or more of the client computing systems 12 and CAD workstations 16 under any known method of permitting computers to communicate, such as through a local area network ("LAN") 64, or a wide area network ("WAN") or the Internet 66. Such networking environments are well known in wired and wireless enterprise-wide computer networks, intranets, extranets, and the Internet. Other embodiments include other types of communication networks including telecommunications networks, cellular networks, paging networks, and other mobile networks.

When used in a LAN networking environment, the CAD workstation 16 is connected to the LAN 64 through an adapter or network interface 68 (communicatively linked to the bus 24). When used in a WAN networking environment, the CAD workstation 16 may include a modem 68 or other device, such as the network interface 68, for establishing communications over the WAN/Internet 66. The modem 68 is shown in FIG. 1 as communicatively linked between the interface 58 and the WAN/Internet 66. In a networked environment, program modules, application programs, or data, or portions thereof, can be stored on, or passed through, the server computer 18. In the depicted embodiment, the CAD workstation 16 is communicatively linked to the server computer 18 through the LAN 64 or the WAN/Internet 66 with TCP/IP middle layer network protocols; however, other similar network protocol layers are used in other embodiments, such as User Datagram Protocol ("UDP"). Those skilled in the relevant art will readily recognize that the network connections shown in FIG. 19 are only some examples of establishing communication links between computers, and other links may be used, including wireless links.

The host computing system 14 include one or more peripheral devices for producing artificial anatomical models based on the digital models. For example, host computing system 14 may include a rapid prototyping machine (e.g., 3-dimensional printer) 69 coupled to the CAD workstation 16 to receive machine instructions over the LAN 64 and/or WAN or Internet 66.

The client computing system 14 contains many of the same or similar structures, systems and subsystems as the CAD workstation 16, thus only the differences will be discussed in detail. The client computing system 14 is communicatively linked to a first biomedical sensor, such as an MRI device 70, typically through the LAN 64 or the WAN/Internet 66 or other networking configuration such as a direct asynchronous connection (not shown). The client computing system 14 may also be communicatively linked to a second biomedical sensor, such as a CT device 24, typically through the LAN 64 or the WAN/Internet 66 or other networking configuration such as a direct asynchronous connection (not shown). While not illustrated, the client computing system 14 may include more than one computer, and may include a server (not shown) for networking a number of client computers. The client computing system 14 may include client software applications 73 for resolving, managing or manipulating the diagnostic data from the MRI device 70 and/or CT device 72. The client computing system 14 may include software applications for communicating with the CAD workstation 16, for example, a browser 74. The software applications can be stored on any of a variety of computer-readable media.

The server computer 18 contains many of the same or similar structures, systems and subsystems as the CAD workstation 16, thus only the differences will be discussed in detail. The server computer 18 includes server applications 76 for the routing of instructions, programs, data and agents between the MRI device 70, CT device 72, client computing system 12 and CAD workstation 16. For example the server applications 76 may include conventional server applications such as WINDOWS NT 4.0 Server, and/or WINDOWS 2000 Server, available from Microsoft Corporation of Redmond, Wash. Additionally, or alternatively, the server applications 76 can include any of a number of commercially available Web servers, such as INTERNET INFORMATION SERVICE from Microsoft Corporation and/or IPLANET from Netscape. The server computer 18 also includes one or more secure Webpages 77, serving as a user interface ("UI") for exchanging data, information and requests between the diagnostic and/or clinical sites and the design and/or manufacturing sites. The server applications 76 and/or Webpages 77 can be stored on any of a variety of computer-readable media.

Figure 20A:
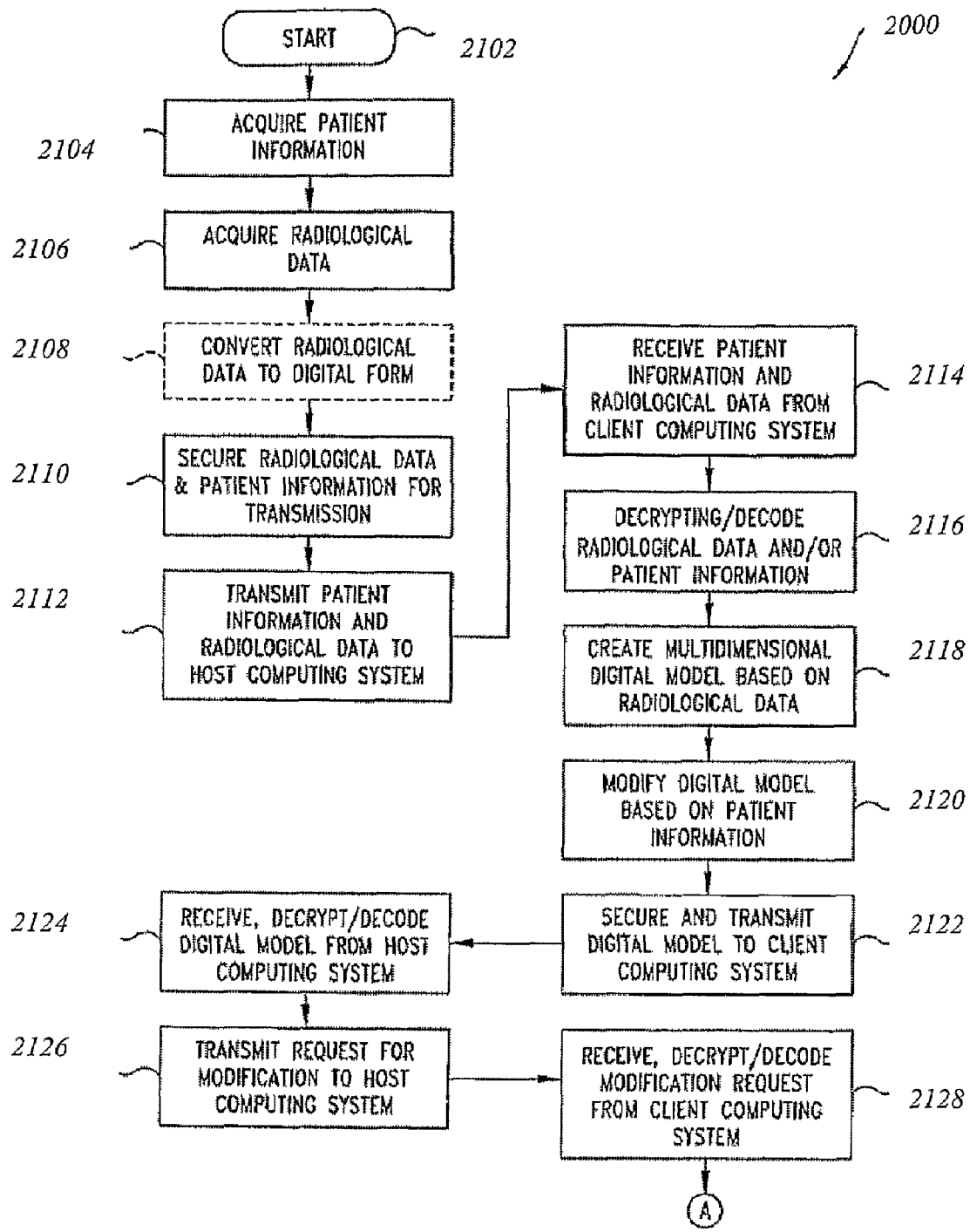
FIG. 20 shows a flow diagram setting forth steps in a first stage FIG. 20A and a second stage FIG. 20B of a rapid production process embodiment for producing an artificial anatomical model.
Figure 20B:
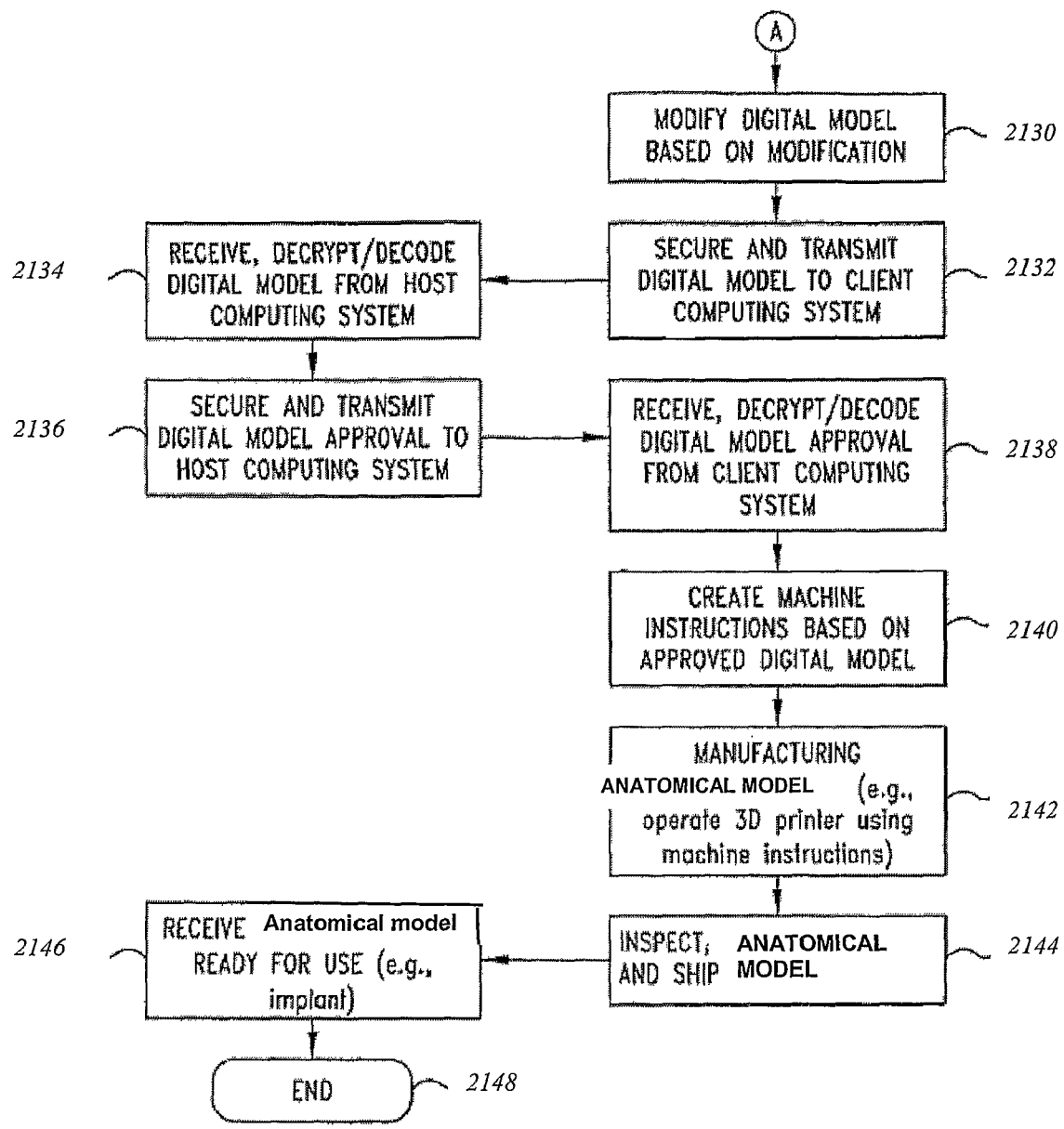

FIGS. 20A and 20B is a flow diagram showing steps of a method 2000 in accordance with one embodiment of the present invention, starting in step 2102. Steps on the left side of the flow diagram correspond to client side operations, while steps on the right side of the flow diagram correspond to host or server side operations. In step 2104, the attending physician or assistant at the diagnostic or clinical site acquires patient information. Patient information can include non-radiological patient data such as a patient's gender, a patient's age, a unique patient identifier, a dosage, allergies, sensitivities to drugs, medical history and/or one or more physical dimensions such as height, weight, length, circumference.

In step 2106, the attending physician acquires patient-specific radiological data regarding the surgical or reconstruction site. As discussed generally above and in detail below, radiological data may be acquired using an MRI device 70 (FIG. 19), CT device 72, ultrasound device, nuclear medicine based device, mammography device, or other transducer. The output from the transducer may take a variety of forms, for example, digital or analog electrical signals, or displayed or printed images. In optional step 108, the client computing system 12 converts the acquired radiological data into a suitable form for transmission. For example, the client computing system 12 may convert analog electrical signals into a digital representation suitable for transmission over the communications network, or the client computing system 12 may digitize a printed image. In many embodiments, the transducer output will be in digital form, and thus will not require significant conversion. After conversion, the client computing system 12 may save the radiological data into a computer hard drive, floppy disk, compact disk, or other form of data storage.

In step 2110, the client computing system 12 applies any desired security measures to the radiological data and patient information, prior to transmission. Security may be an important feature for protecting patient confidentiality, and may even be required by current or future legislation. For example, the radiological data and patient information can be encrypted, password protected and/or authenticated using digital certificates, such as by conventional public key encryption techniques. In step 2112, the client computing system 12 securely transmits the radiological data and patient information to the host computing system 14 using encryption, password protection, digital certificates and/or other methods for providing secure communications.

In step 2114, the host computing system 14 receives the transmitted radiological data and patient information at the server 18. In step 116, the host computing system 12 decrypts, decodes and/or otherwise gains access to the radiological data and/or patient information, as required. The server 18 may decrypt and/or decode the radiological data and patient information before forwarding the radiological data and patient information to the CAD workstation 16. Alternatively, the server 18 may forward the encrypted or encoded radiological data and/or patent information to the CAD workstation 16, relying on the CAD workstation 16 to decrypt and/or decode the radiological data and/or patient information.

In step 2118, the CAD workstation 16 creates a multi-dimensional digital model from the radiological data. The term digital is employed to clearly distinguish the abstract representation from physical models. The multi-dimensional digital model may take the form of a CAD solid model, surface or wire-frame representation, employing any of a variety of standard CAD formats and commercially available CAD packages, some of which are discussed below.

In step 2120, the CAD workstation 16 modifies the multi-dimensional digital model, for example, based on the patient information. For example, the geometry of the multi-dimensional digital model may be modified to add attachment structure, fixture points, separation markings, boundaries or surfaces between various bodily structures and/or other elements not contain in, or difficult to discern from the radiological data. Patient information such as gender, age, weight or height may be used to select certain characteristics using histographic or demographic information. For example, the patient age and/or gender may be used to select an appropriate bone density or porosity from a database of demographic bone density or porosity information. The digital model can be modified to produce an appropriate bone density or porosity, and may even reflect a gradation of bone density or porosity along one or more directions. The host computing system 14 may rely on one or more stored transformations for modifying the digital model. The stored transformations can take the form of predefined scripts for executing one or more CAD functions on the digital model. The transformations may be selected by the operator, or may be automatically selected and applied by the host computing system 14. For example, the host computing system 14 may automatically select and apply a given transformation based on one or more pieces of the patient information.

In step 2122, the host computing system 14 encrypts and/or encodes the digital model and transmits the secured digital model to the client computing system 12. In step 124, the client computing system 12 receives the digital model and decrypts and/or decodes the same. The attending physician may view the digital model, for example displaying the model on a display using standard CAD packages or limited functionality viewers for CAD files (i.e., software packages that permit viewing, but not editing). In step 126, the client computing system 12 transmits one or more requests for modification to the host computing system 14. As in the other communications, the requests for modification may be encrypted and/or encoded to secure the communications.

Steps 2128, 2130, 2132, 2134, 2136 and 2138 are optional if interaction with physician in the design of the artificial anatomical model is desired. In step 2128, the host computing system 14 receives the requests for modification, and decrypts and/or decodes the same. In step 2130, the CAD workstation 16 modifies the digital model based on the modification requests. The modification may require the exercise of significant skill by the CAD operator, who may be an engineer or appropriately trained technician. The CAD operator must ensure that the requested modification is implemented in a fashion consistent with the available materials, equipment and manufacturing techniques. This approach reduces or eliminates the need for the physician to understand the details of materials and/or manufacturing. In step 2132, the host computing system 14 transmits the modified digital model to the client computing system 12, employing appropriate security measures. In step 2134, the client computing system 12 receives, decrypts and/or decodes the modified digital model. The steps 2124-2134 can be repeated until the attending physician is satisfied with the digital model. In step 2136, the client computing system 12 transmits an approval to the host computing system, indicating that the attending physician is satisfied with the digital model. In step 138, the host computing system 14 receives the model approval from the client computing system 12, and decrypts and/or decodes the same, if necessary.

In step 2140, the CAD workstation 16 creates machine instructions from the digital model. In step 2142, an artificial anatomical model geometrically mimicking an anatomical structure from the patient is manufactured using the digital model. The manufacturing rapid prototyping techniques (free form fabrication), preferably stereolithography, to take advantage of the information inherent in the digital model which is not typically reproducible using standard manufacturing techniques. For example, the digital model may define internal structures, different materials, densities, density gradients, pharmacological agents and the like, which may require free form fabrication to create such structure in a finished product. In step 2144, the customized artificial anatomical model is shipped to the physician. In step 2146, the physician receives the artificial anatomical model, wherein the artificial anatomical model is used for rehearsal or for some other use. The method 2000 terminates in step 2148.

In manufacturing the artificial anatomical models, patient-specific data (i.e., radiological data, patient information) is obtained from various non-invasive or invasive procedures. Typical non-invasive procedures from which radiological data may be obtained include diagnostic or clinical procedures such as magnetic resonance imaging (MRI) scans, computerized tomography (CT) scans, ultrasounds, nuclear medicine procedures or mammography procedures. Additionally, standard radiographs such as x-rays may be digitized into an electronic file by either a video camera or a film scanner. Yet another type of imaging equipment, which may be useful, although only for measuring external contours of the body, is a laser scanner which digitizes the contours of an external surface. Details of how medical images can be stored, transmitted and handled are given in "PACS: Basic Principles and Applications," by H. K Huang (editor), 1999 Liley-Liss, and in the same author's earlier book, "PACS: Picture Archiving and Communication Systems in Biomedical Imaging."

The radiological imaging equipment is available at many medical facilities, but other equipment involved in the present invention is more specialized and may only be available at few centralized locations. This makes it useful to transmit diagnostic imaging information from the patient's location to a central site, allowing global access to otherwise limited design and manufacturing resources.

One example of a framework for transmitting electronic medical imaging data between various sites is the "Digital Imaging Communications in Medicine ("DICOM") standard developed by the American College of Radiology ("ACR") and the National Electrical Manufacturer's Association ("NEMA"). DICOM is based upon the Open System Interconnect (OSI) reference model, which defines a 7-layer protocol. Data may further be transmitted via common telephone lines (twisted pairs of copper wire), digital phone lines (ISDN, switched-56), DSL, coaxial cable, cable modem, fiber-optic cable, microwave, satellite, and T-1, T-3, OC-3, and other forms of telecommunications links. In regard to all data transmissions mentioned herein, privacy and security issues have become prominent issues in regard to the maintenance and transfer of individuals' medical data. Accordingly, it would be advantageous to encrypt the data before transmission and to decrypt the data after transmission, as is known in the art. Alternately, data could also be transmitted, for example, by storing the data on a data storage device such as a floppy disc, compact disc, DVD disc, optical disc, magneto-optic disc, WORM (write once read many times) disc, and sending the storage device via traditional mail services. In the event that the manufacturing site coincides with the location of the patient, the doctor and the diagnostic equipment, data transmission via the Internet may not be necessary.

Radiological data such as MRI or CT scans is normally presented as sets of two-dimensional images (sections) showing all of the patient's tissues. The slices in a CT scan or an MRI scan associate an intensity of brightness on the display with each coordinate location in a scan. In a CT scan, darkness corresponds to absorption of X-rays, that most closely correlates with density of the tissue. In an MRI scan, intensity refers to the presence of certain elements. CT scans are considered better for imaging hard tissue such as bone, and MRI scans are considered better for imaging soft tissue. There may be instances in which it is advantageous to use both types of imaging together with each other.

In some instances, the diagnostic scans may need further processing. Further processing may include, for example, more clearly distinguishing between hard and soft tissue, as well as defining solid boundaries or surfaces of the hard tissue, for example, bone, in the two-dimensional planes or sections in which the MRI or CT scans typically are presented. Identifying the edges or surfaces of bone can be achieved by appropriate sampling and threshold definition techniques (perhaps including contrast enhancement) and geometrical algorithms such as in the software package MIMICS (from Materialise Europe; Ann Arbor, Mich.). This initially processed data may further be converted to a form that geometrically represents a multi-dimensional form representing an anatomical structure. Such mathematical representations typically feature curved surfaces with resolution available to almost any desired precision anywhere on the surface, not only at locations which were part of the scan planes of the original MRI or CT data. For at least some of the types of radiological data (e.g., MRI or CT scans), there is a coarseness in the raw data that is acquired by radiologists or other medical personnel. Typically data is available at sampling planes which are parallel to each other and are spaced apart at intervals of 1 to 2 millimeters, which is coarser than the feature size typically desired in a custom manufactured implant. This increased or improved level of geometric detail is achieved through, for example, the use of interpolation, curve fitting, spline fitting, and surface fitting.

Once a digital model has been created from the diagnostic data, the multi-dimensional digital model essentially becomes just another data set or mathematical object capable of being further processed or manipulated by standard CAD software. Suitable CAD software packages for further processing the digital model include SolidWorks (SolidWorks, Concord Mass.) and ProEngineer (Parametric Technologies, Waltham, Mass.).

In accordance with another embodiment, radiological data is combined from more than one type of scan, such as MRI and CT. In combining two different scans typically taken with two different sets of equipment and two different positionings of the patient, one challenge is to determine the appropriate relative position and orientation of the models obtained from the two methods. One approach is to employ the CAD software's ability to calculate the centroid of a solid object. Aligning centroids of objects resulting from different types of scans is one way of comparing them. Alternatively, or in conjunction with aligning the centroids, the parts can be aligned as far as angular orientation. Another approach employs the CAD software's ability to mathematically subtract one model from the other, for example, by a Boolean operation, to obtain a set of space representing points which are members of one model or the other model but not both. The volume is calculated by the CAD software. When the volume of this spatial difference is minimized, the best alignment of the two parts has been achieved. After the best alignment is achieved, a combination or average of the two scan results could be calculated and used for the best representation of the surfaces.

In one version, the designed digital model data is transmitted back to the physician and/or patient for their review. Multiple review iterations may be performed as changes are discussed and agreement is reached with the doctor/patient. A system 10 that is implemented in hardware could allow a substantial number of design iterations in a short period of time particularly if it operates in near real time. Further, such a system 10 could provide the medical field a capability of concurrent design or collaborative or interactive design. The final digital model file can be transmitted over the Internet to the manufacturing machine if that machine is located at still another location. Thus, the computer facilities and software that process the radiological data to form the digital model do not have to be co-located with the manufacturing facility.

In yet another version, various details are transmitted back to the client or physician for viewing along with the digital model. If the transmittal of proposed designs from the remote location back to the physician is done by files such as IGES or STEP, it will be possible to transmit as much geometric detail as desired, but it may not be possible to transmit much compositional detail such as distributions of color on the surface, or other compositional variation such as placement of bioactive substances. IGES would be more limiting than STEP in this respect. If the transmission of data is done with proprietary file formats, it may require that the physician use a particular CAD software for viewing the image of the proposed part. It may not be necessary for the physician to have a complete license to the CAD software used in making the patient-unique digital model; since many software packages offer simplified versions having the capability of opening and viewing files generated by the program, but without the ability to modify such files. Alternatively, the computer terminal at the physician could simply be configured as a remote user of the software that is installed at the host computing system 14 (FIG. 19).

Encryption, password protection and digital certificate authentication is desirable in any such data transmission. Transmission of approval from the physician to the manufacturer can be stored with the file containing the agreed-upon design, forming a record of the same.

Finally, while various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims. The teachings of all patents and other references cited herein are incorporated herein by reference to the extent they are not inconsistent with the teachings herein.

What is claimed is:

1. A method of testing a device designed for invasive transmission through a luminal structure comprising:
   obtaining an artificial anatomic model configured to geometrically mimic a lumen possessing human or nonhuman animal anatomic structure, said model comprising a luminal structure having an inner luminal wall surface region comprising hydrogel, and an analog material employed by said artificial anatomic model designed to simulate at least one predetermined physical characteristic of a target tissue; wherein said artificial anatomical structure is configured to geometrically mimic vasculature, further comprising
   artificial support tissue; a luminal structure supported by said artificial support tissue, and comprising a first analog material disposed along an inner luminal wall surface of said luminal structure, said first material analog having a structural integrity simulating at least one predetermined characteristic of an inner surface of said vasculature;
   a liquid reservoir adapted to hold a liquid; and
   a pump in fluid communication with said luminal structure, said pump causing a pulsed or continuous liquid circulation, said pump circulating said liquid from said reservoir through said luminal structure;
   transmitting said device through said luminal structure such that said device bears on said region; and
   evaluating how said region is affected by transmission of said device through said luminal structure.

2. The method of claim 1, wherein said luminal structure comprises at least one layer simulating vascular tunica intima, tunica media, tunica adventitia, endothelium, internal elastic membrane, external elastic membrane, circular muscles, or adipose layer.

3. The method of claim 1, wherein said luminal structure comprises an analog material that simulates at least one predetermined physical characteristic of an inner luminal surface of said lumen possessing human or nonhuman animal anatomical structure, said at least one predetermined physical characteristic selected from the group consisting of material strength in multi-axial tension, compression, or shear; material modulus in multi-axial tension, compression, or shear; coefficient of static or dynamic friction; elasticity; lubricity; surface energy; hydrophilicity; water content; electrical resistance; electrical conductivity; dielectric properties; light and heat absorption or adsorption; chemical absorption or adsorption; or porosity.

4. The method of claim 1 wherein said evaluating comprises determining abrasion, stress, strain, or perforation to said model by said transmission of said device through said model.

5. The method of claim 1, wherein said determining step is achieved by visual inspection without using a light microscope, electron micrograph, or atomic force microscope.

6. The method of claim 1, wherein said luminal structure is cooperative with artificial support tissue; and wherein said luminal structure is disassociated with said artificial support tissue prior to said evaluating step.

* * * * *